(12) United States Patent
Furukawa et al.

(10) Patent No.: US 11,173,858 B2
(45) Date of Patent: Nov. 16, 2021

(54) VEHICLE POWER SUPPLY SYSTEM

(71) Applicant: Mazda Motor Corporation, Hiroshima (JP)

(72) Inventors: Akihiro Furukawa, Hiroshima (JP); Seiyo Hirano, Hiroshima (JP); Hideki Sanai, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 79 days.

(21) Appl. No.: 16/775,285

(22) Filed: Jan. 29, 2020

(65) Prior Publication Data

US 2020/0247340 A1 Aug. 6, 2020

(30) Foreign Application Priority Data

Feb. 5, 2019 (JP) .............................. JP2019-018626

(51) Int. Cl.
| | |
|---|---|
| *B60L 1/00* | (2006.01) |
| *B60R 21/013* | (2006.01) |
| *B60L 53/22* | (2019.01) |
| *B60L 50/60* | (2019.01) |
| *H02J 7/00* | (2006.01) |
| *B60R 21/0132* | (2006.01) |
| *H02J 7/34* | (2006.01) |

(52) U.S. Cl.
CPC ............ *B60R 21/013* (2013.01); *B60L 50/66* (2019.02); *B60L 53/22* (2019.02); *B60R 21/0132* (2013.01); *H02J 7/007188* (2020.01); *B60L 2210/10* (2013.01); *H02J 7/345* (2013.01); *H02J 2207/20* (2020.01)

(58) Field of Classification Search
CPC ..................................................... B60R 21/013
USPC ........................................................ 307/10.1
See application file for complete search history.

(56) References Cited

U.S. PATENT DOCUMENTS

| | | | | |
|---|---|---|---|---|
| 5,501,486 | A * | 3/1996 | Fujita ..................... | G01P 15/135 280/735 |
| 2004/0246635 | A1* | 12/2004 | Morita ................... | H02J 7/0016 361/1 |
| 2012/0215442 | A1* | 8/2012 | Sambongi ............. | G01C 21/165 701/472 |

FOREIGN PATENT DOCUMENTS

| | | |
|---|---|---|
| JP | 2016-111754 A | 6/2016 |
| WO | WO-2011078577 A2 * | 6/2011 ............... B60L 50/40 |

* cited by examiner

*Primary Examiner* — Daniel Cavallari
*Assistant Examiner* — Dru Parries
(74) *Attorney, Agent, or Firm* — Xsensus LLP

(57) ABSTRACT

A vehicle power supply system configured to be installed in a vehicle. The vehicle power supply system includes a battery having a rated voltage lower than a first voltage; a capacitor having a rated voltage higher than the first voltage; circuitry configured to discharge electric charge stored in the capacitor; and a controller configured to control the circuitry to charge the battery by discharging the electric charge stored in the capacitor in response to detection of a collision of the vehicle or detection of a process to replace the capacitor.

19 Claims, 13 Drawing Sheets

VEHICLE POWER SUPPLY SYSTEM

CROSS-REFERENCE TO RELATED APPLICATION

The present application claims priority to JP 2019-018626, filed Feb. 5, 2019, the entire contents of which are incorporated herein by reference.

TECHNICAL FIELD

The present disclosure relates to vehicle power supply system, and more particularly, to a vehicle power supply system to be installed in a vehicle.

BACKGROUND

JP-A-2016-111754 (PTL 1) describes an automobile. This automobile performs three-phase-on control that turns on all transistors of the upper arm or all transistors of the lower arm of the plurality of transistors of an inverter when a collision of the vehicle is detected and the motor is rotating. In addition, discharge control for discharging the electric charge stored in the capacitor of the power supply system is performed by stopping the rotation of the motor via this three-phase-on control and then flowing d-axis current through the motor after stopping the rotation of the motor. In addition, since the inverter for driving the motor may be overheated by performing the three-phase-on control, when the temperature of the inverter is raised to the threshold or higher, the three-phase-on control is aborted to prevent the discharge control from being aborted in the automobile described in PTL 1.

PRIOR ART DOCUMENTS

Patent Documents

[Patent document 1] JP-A-2016-111754

SUMMARY

When the capacity of the capacitor to be installed in the vehicle is large, however, sufficient discharge may not be performed only by flowing d-axis current through the motor unlike the invention described in PTL 1. In addition, since the electric charge stored in the capacitor needs to be discharged when the capacitor is replaced, the electric charge stored in the capacitor needs to be rapidly discharged to immediately replace the capacitor at the time of maintenance.

Accordingly, the inventors of the present disclosure identified novel configuration for a vehicle power supply system capable of discharging the electric charge stored in the capacitor surely and rapidly when, for example, the vehicle collides.

According to the present disclosure there is provided a vehicle power supply system to be installed in a vehicle, including a battery having a rated voltage lower than a predetermined voltage; a capacitor having a rated voltage higher than the predetermined voltage; a capacitor discharging device that discharges electric charge stored in the capacitor; and a control device that controls the capacitor discharging device, in which the control device controls the capacitor discharging device so that the electric charge stored in the capacitor is discharged and the battery is charged with the discharged electric charge when the vehicle collides or when the capacitor is replaced.

According to the present disclosure configured as described above, since the capacitor discharging device discharges the electric charge stored in the capacitor and the battery is charged with the discharged electric charge when the vehicle collides, the electric charge stored in the capacitor can be discharged early and surely. In addition, since the electric charge stored in the capacitor can be discharged rapidly and the inter-terminal voltage of the capacitor can be lowered quickly when the capacitor is replaced, the capacitor can be replaced immediately. Since the battery has a rated voltage lower than the predetermined voltage, even when the battery is charged with the electric charge discharged from the capacitor, the voltage is suppressed to a regulated voltage or less and there is no risk associated with a high voltage.

In addition, according to the present disclosure configured as described above, the capacitor discharging device also discharges the electric charge stored in the capacitor when the capacitor is replaced and the battery is charged with the discharged electric charge. Accordingly, the electric charge stored in the capacitor to be replaced can be discharged rapidly and the capacitor can be replaced safely.

In the present disclosure, preferably, the capacitor discharging device has a DC-to-DC converter and the control device controls the capacitor discharging device so that the DC-to-DC converter lowers a voltage of the electric charge discharged from the capacitor and the battery is charged with the lowered voltage when the vehicle collides or when the capacitor is replaced.

According to the present disclosure configured as described above, when the vehicle collides or when the capacitor is replaced, the voltage of the capacitor is lowered by the DC-to-DC converter and the battery is charged with the lowered voltage. Accordingly, even when the inter-terminal voltage of the capacitor and the inter-terminal voltage of the battery are greatly different from each other, the battery can be charged with the electric charge stored in the capacitor while suppressing the degradation of the battery.

In the present disclosure, preferably, electric charge storable in the capacitor is less than electric charge storable in the battery.

According to the present disclosure configured as described above, since the electric charge storable in the capacitor is less than the electric charge storable in the battery, the electric charge stored in the capacitor can be discharged to the battery in a short time. In addition, since the electric charge storable in the battery is greater, even when the battery is charged with the electric charge discharged from the capacitor, the inter-terminal voltage of the battery is hardly raised, the voltages of the battery and the capacitor can be surely lowered.

In the present disclosure, preferably, the control device controls the capacitor discharging device so that the voltage of the capacitor is lowered to the predetermined voltage or less within a predetermined time from occurrence of a collision of the vehicle or from reception of a signal indicating that the battery is potentially replaced.

According to the present disclosure configured as described above, since the capacitor discharging device lowers the voltage of the capacitor to the predetermined voltage or less within the predetermined time from occurrence of a collision of the vehicle, safety at the time of a collision can be ensured more surely.

According to the present disclosure configured as described above, the capacitor discharging device also lowers the voltage of the capacitor to the predetermined voltage or less when the capacitor is replaced within the predetermined time. Accordingly, since the voltage of the capacitor is lowered rapidly when the capacitor is replaced, the capacitor can be replaced safely and immediately.

In the present disclosure, preferably, the control device controls the capacitor discharging device so that the electric connection between the battery and the capacitor is broken when the voltage of the capacitor is lowered to the predetermined voltage or less.

Since the rated voltage of the battery is set to a value less than the predetermined voltage in the present disclosure, when the voltage of the capacitor is lowered to the predetermined voltage or less, the electric connection between the battery and the capacitor is broken by the capacitor discharging device. Accordingly, even when the battery and the capacitor are connected in series, since a high-voltage component having a voltage more than the predetermined voltage is not present after the connection is broken, electric shock protection performance can be ensured sufficiently.

In the vehicle power supply system according to the present disclosure, the electric charge stored in the capacitor can be discharged surely and rapidly when, for example, the vehicle collides.

DETAILED DESCRIPTION

Next, embodiments of the present disclosure will be described with reference to the attached drawings.

Figure 1:
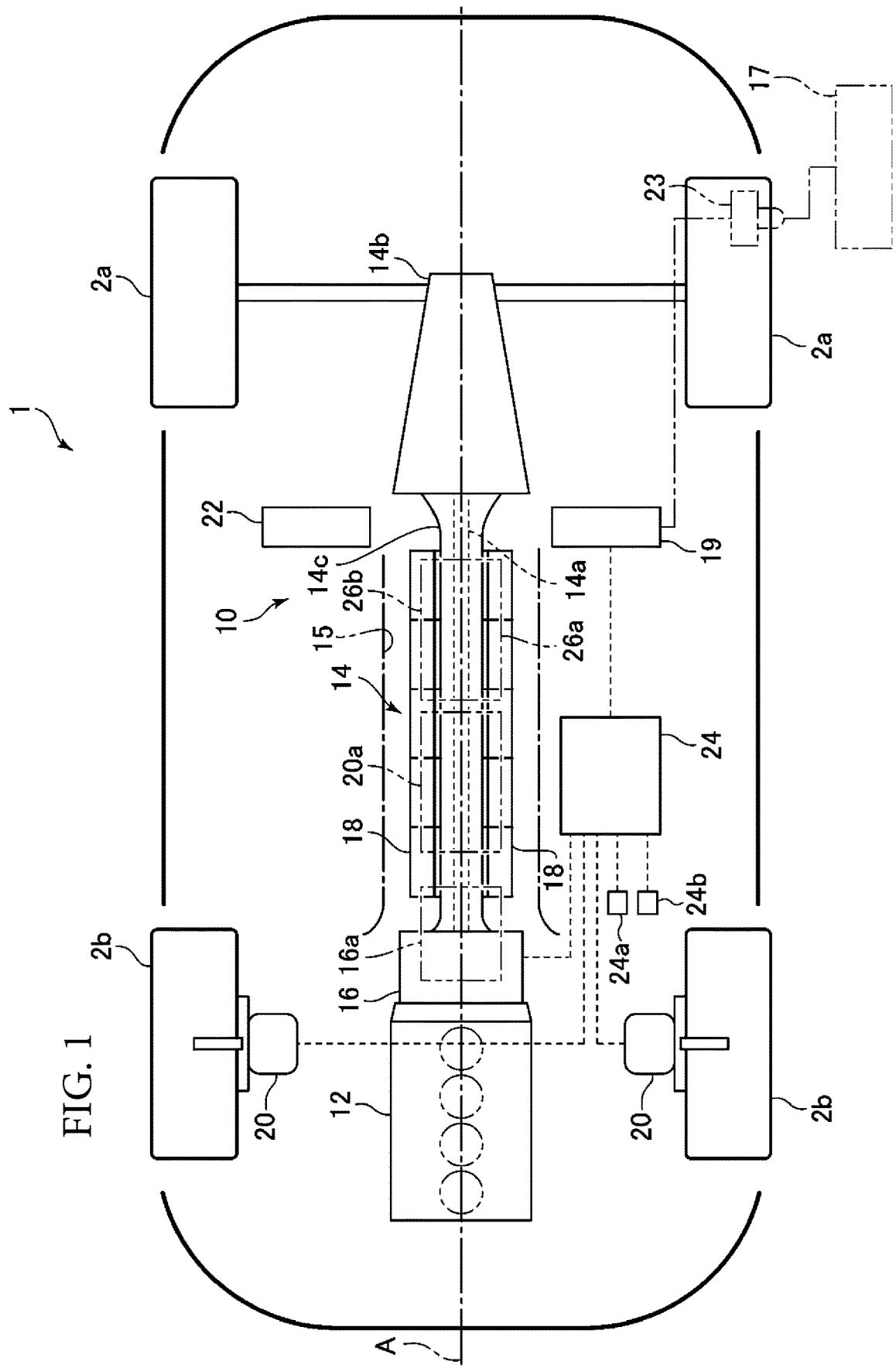
FIG. 1 illustrates a layout of a vehicle having a vehicle power supply system according to a first embodiment of the present disclosure.

FIG. 1 illustrates a layout of a vehicle having a vehicle power supply system according to a first embodiment of the present disclosure.

As illustrated in FIG. 1, a vehicle 1 having a vehicle power supply system 10 according to the first embodiment of the present disclosure is a so-called an FR (front-engine/rear-drive) vehicle that includes an engine 12, which is an internal combustion engine, in the front part (ahead of the driver's seat) of the vehicle and drives a pair of left and right rear wheels 2a, which are main driving wheels. In addition, as described later, the rear wheels 2a are also driven by a main driving motor and a pair of left and right front wheels 2b, which are sub-driving wheels, is driven by sub-driving motors, which are in-wheel motors.

That is, the vehicle 1 includes the engine 12 that drives the rear wheels 2a as a vehicle driving device, a power transmission mechanism 14 that transmits a driving force to the rear wheels 2a, a main driving motor 16 that drives the rear wheels 2a, sub-driving motors 20 that drive the front wheels 2b, and a control device 24. In addition, the vehicle 1 has an inverter 16a that converts a DC voltage to an AC voltage and drives the main driving motor 16 and an inverter 20a that converts a DC voltage to an AC voltage and drives the sub-driving motors 20.

In addition, the vehicle power supply system 10 according to the first embodiment of the present disclosure installed in the vehicle 1 includes a battery 18, a capacitor 22, and a charging device 19 and a power feeding port 23 that receive electric power from an external power supply 17 and charging the battery 18 and the capacitor 22. The specific structure of the vehicle power supply system 10 according to the embodiment will be described later.

The engine 12 is an internal combustion engine that generates a driving force for the rear wheels 2a, which are the main driving wheels of the vehicle 1. In the embodiment, an inline four-cylinder engine is adopted as the engine 12 and the engine 12 disposed in the front part of the vehicle 1 drives the rear wheels 2a via the power transmission mechanism 14.

The power transmission mechanism 14 transmits the driving forces generated by the engine 12 and the main driving motor 16 to the rear wheels 2a, which are main driving wheels. As illustrated in FIG. 1, the power transmission mechanism 14 includes a propeller shaft 14a, which is a power transmission shaft connected to the engine 12 and the main driving motor 16, and a transmission 14b, which is a shifting gearbox.

The main driving motor 16 is an electric motor that generates a driving force for the main driving wheels, and disposed behind the engine 12 adjacently to the engine 12 on the vehicle body of the vehicle 1. In addition, the inverter 16a is disposed adjacently to the main driving motor 16 and the inverter 16a converts a DC voltage of the battery 18 to an AC voltage and supplies the AC voltage to the main driving motor 16. In addition, as illustrated in FIG. 1, the main driving motor 16 is connected in series to the engine 12 and a driving force generated by the main driving motor 16 is also transmitted to the rear wheels 2a via the power transmission mechanism 14. In addition, in the embodiment, a 25-kW permanent magnet motor (permanent magnet synchronous motor) driven by 48 V is adopted as the main driving motor 16.

The sub-driving motors 20 are provided in the front wheels 2b to generate driving forces for the front wheels 2b, which are sub-driving wheels. In addition, the sub-driving motors 20 are in-wheel motors and are accommodated in the front wheels 2b, respectively. In addition, the DC voltage of the capacitor 22 is converted to an AC voltage by the inverter 20a disposed in a tunnel portion 15 and the AC voltage is supplied to the sub-driving motors 20. Furthermore, in the embodiment, the sub-driving motors 20 do not have speed reducers as speed reduction mechanisms, and the driving forces of the sub-driving motors 20 are directly transmitted to the front wheels 2b, and the wheels are directly driven. In addition, in the embodiment, 17-kW induction motors are adopted as the sub-driving motors 20.

The battery 18 is an electric storage device in which electric energy for mainly operating the main driving motor 16 is stored. Furthermore, in the embodiment, a 3.5 kWh/48 V lithium ion battery (LIB) is used as the battery 18.

The capacitor 22 can store the electric power regenerated by the sub-driving motors 20. The capacitor 22 is disposed at a position substantially symmetrical with the plug-in type charging device 19 in the rear part of the vehicle 1 and supplies electric power to the sub-driving motors 20 provided in the front wheels 2b of the vehicle 1. The sub-driving motors 20 driven mainly by the electric power stored in the capacitor 22 is driven by a higher voltage than in the main driving motor 16.

The charging device 19 is electrically connected to the battery 18 and the capacitor 22 and charges the battery 18 and the capacitor 22 with the electric power supplied from the external power supply 17 such as a charging stand via the power feeding port 23. The external power supply 17 such as a charging stand generally performs charge with a voltage equal to or more than a predetermined lower limit voltage (for example, 50 V) and the vehicle power supply system 10 according to the embodiment supports this lower limit voltage. Non-limiting examples of the external power supply include electric vehicle (EV) charging stations, electric recharging point, charging point, charge point, electronic charging station (ECS) and electric vehicle supply equipment (EVSE), and are elements that supply electric energy for the recharging of plug-in electric vehicles—including electric cars, neighborhood electric vehicles and plug-in hybrids. A specific example of this external power supply is the Society of Automobile Engineers (SAE) J1772 (J plug), which has a lower limit voltage of 50 V and an upper limit voltage of 1000 V.

The power feeding port 23 is a connector provided on the rear side surface of the vehicle 1 and electrically connected to the charging device 19. The connector of the power feeding port 23 is connectable to the plug of an electric cable 17a extending from the external power supply 17 such as a charging stand, and electric power is supplied to the charging device 19 via the power feeding port 23. As described above, the vehicle power supply system 10 according to the embodiment can charge the battery 18 and the capacitor 22 by connecting the external power supply 17 that supplies DC electric power to the power supply port 23 via the electric cable 17a.

The control device 24 receives detection signals from various sensors such as a longitudinal acceleration sensor 24a and a lateral acceleration sensor 24b. In addition, the control device 24 controls the engine 12, the main driving motor 16, and the sub-driving motors 20 based on the detection signals input from the sensors. Specifically, the control device 24 may include a microprocessor, a memory, an interface circuit, programs for operating these components (not illustrated), and the like.

It should be noted here that the control device 24 determines whether the vehicle 1 has collided based on acceleration signals detected by the longitudinal acceleration sensor 24a and the lateral acceleration sensor 24b and, when determining that the vehicle 1 has collided, outputs a control signal for deploying an air bag (not illustrated). In addition, as described later, the air bag deployment signal from the control device 24 is also transmitted to the charging device 19.

Figure 2:
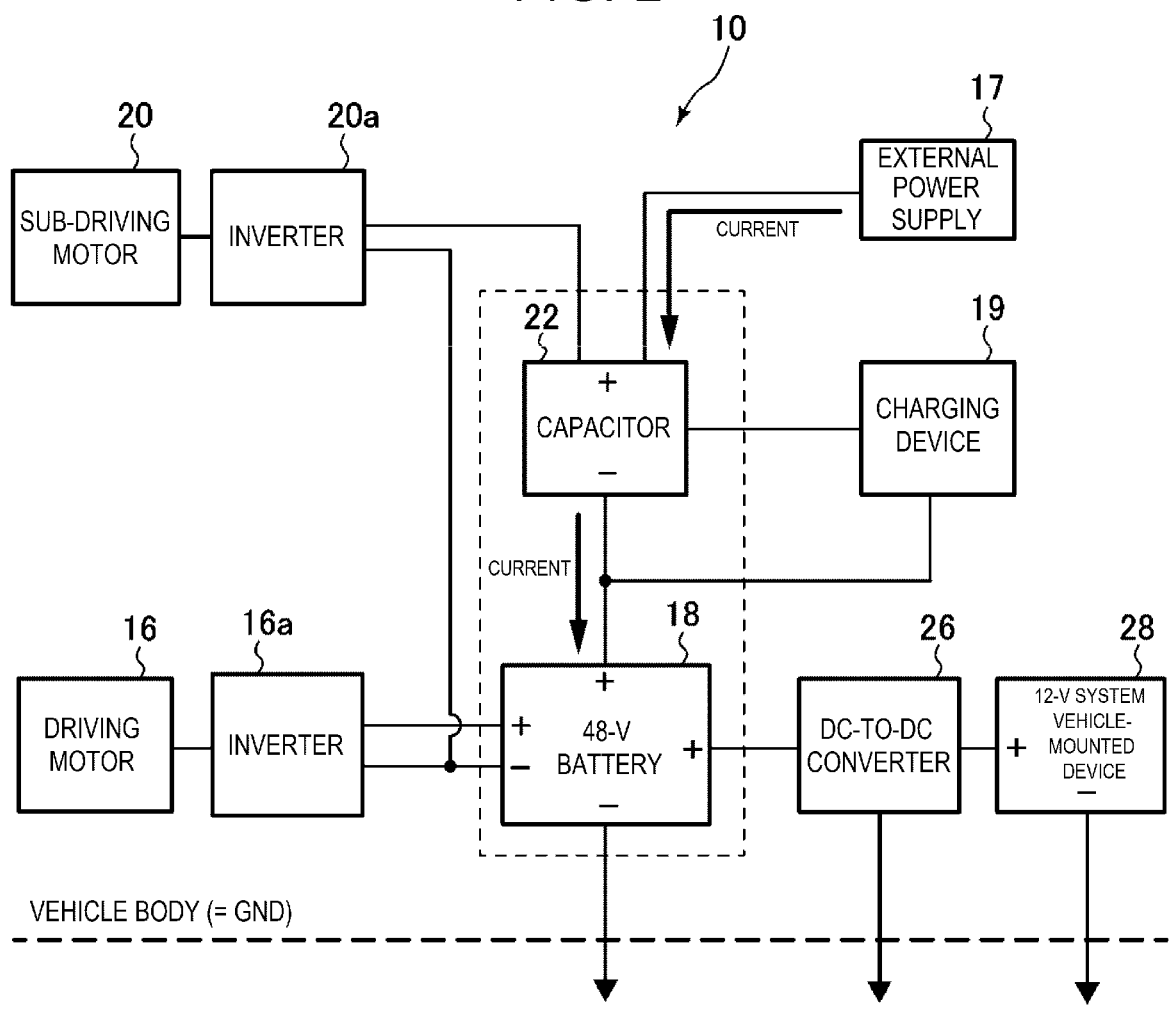
FIG. 2 is a block diagram of the vehicle power supply system according to the first embodiment of the present disclosure and schematically illustrates a flow of current during charge by an external power supply.
Figure 3:
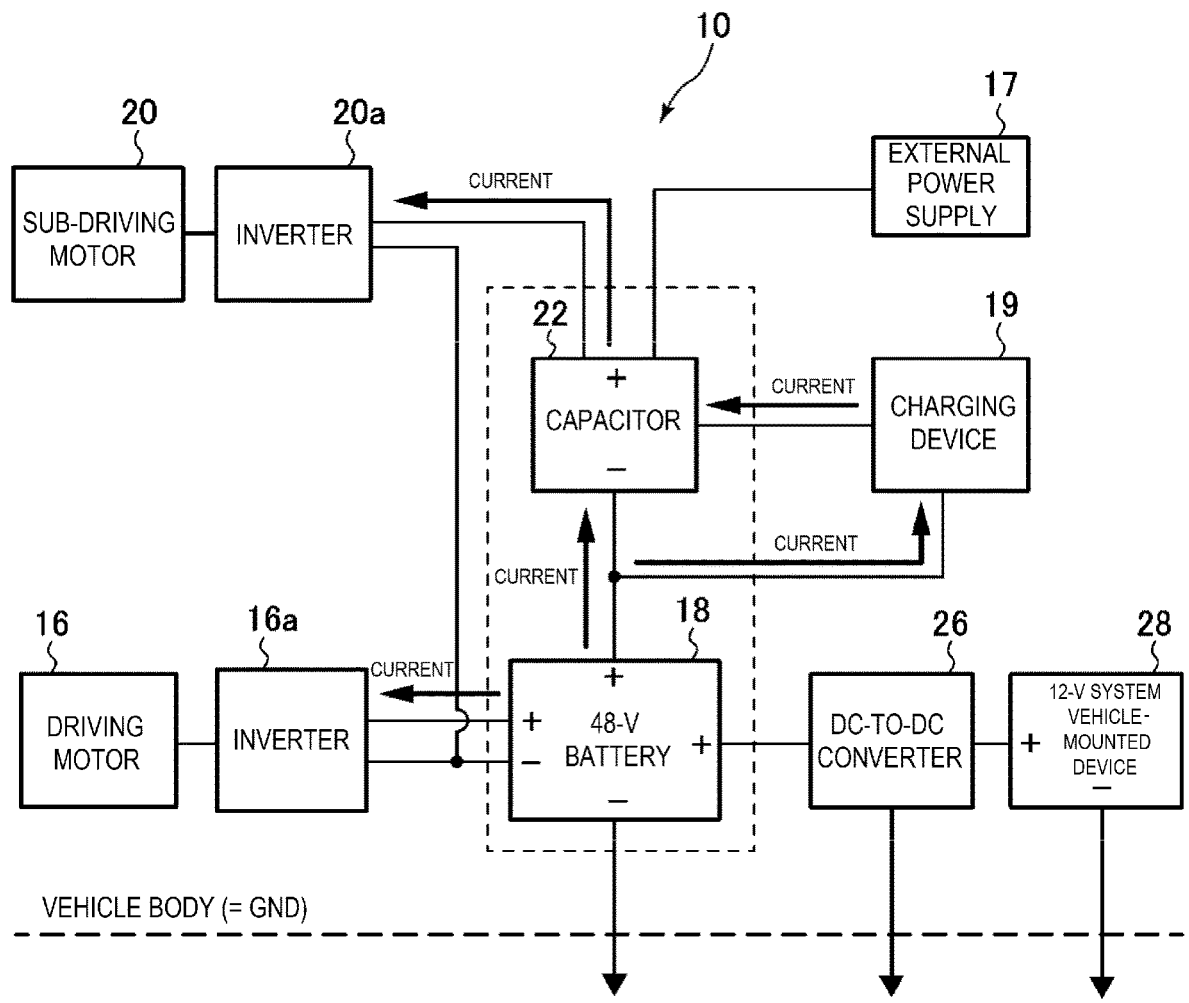
FIG. 3 is a block diagram of the vehicle power supply system according to the first embodiment of the present disclosure and schematically illustrates a flow of current when a main driving motor and sub-driving motors are driven.
Figure 4:
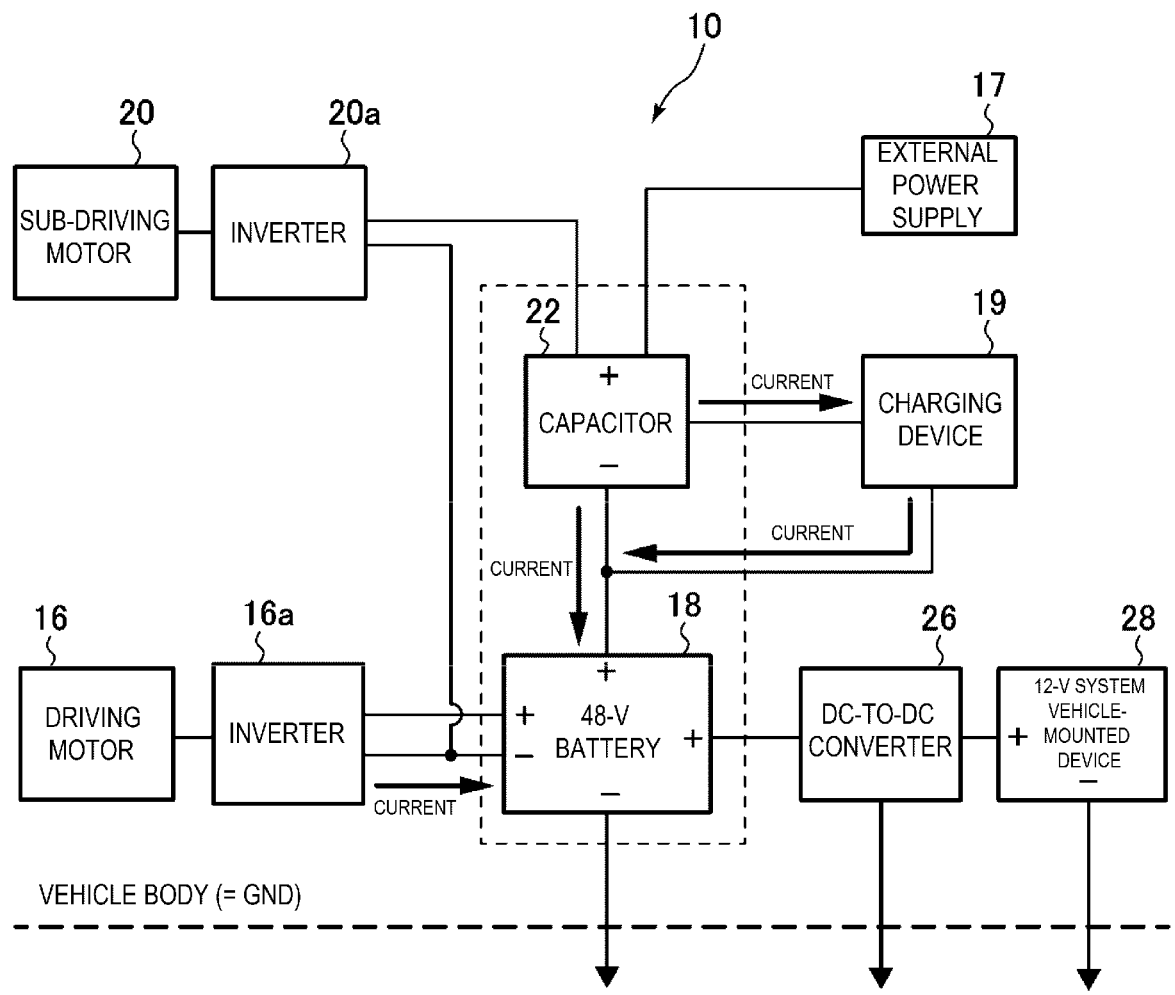
FIG. 4 is a block diagram of the vehicle power supply system according to the first embodiment of the present disclosure and schematically illustrates a flow of current when the electric charge stored in the capacitor is discharged at the time of a collision of the vehicle.

Next, the structure and the operation of the vehicle power supply system 10 according to the first embodiment of the present disclosure will be schematically described with reference to FIGS. 2 to 4. FIG. 2 is a block diagram of the vehicle power supply system 10 according to the first embodiment of the present disclosure and schematically illustrates a flow of current during charge by the external power supply 17. FIG. 3 is a block diagram of the vehicle power supply system 10 according to the first embodiment of the present disclosure and schematically illustrates a flow of current when the main driving motor 16 and the sub-driving motors 20 are driven. FIG. 4 is a block diagram of the vehicle power supply system 10 according to the first embodiment of the present disclosure and schematically illustrates a flow of current when the electric charge stored in the capacitor 22 is discharged at the time of a collision of the vehicle 1.

First, as illustrated in FIG. 2, the battery 18 and the capacitor 22 are connected in series in the vehicle power supply system 10 according to the embodiment. That is, in the embodiment, the battery 18 and the capacitor 22 are electrically connected in series by connecting the positive terminal of the battery 18 and the negative terminal of the capacitor 22 to each other. In addition, the negative terminal of the battery 18 is connected to the body ground of the vehicle 1. In the embodiment, the rated voltage of the battery 18 is set to 48 V, which is lower than the lower limit voltage (50 V) of the external power supply 17, and the rated voltage of the capacitor 22 is set to 72 V, which is higher than the lower limit voltage of the external power supply 17.

In Japanese New Car Assessment Program (JNCAP), "Electric shock protection performance test when an electric vehicle etc. collides" is defined. This electric shock protection performance test is defined to prevent occupants from receiving an electric shock if a collision accident were to occur in an electric vehicle or an electric hybrid vehicle. In addition, this electric shock protection performance test is targeted for automobiles having an electric motor with an operating voltage of 30 VAC or more, or 60 VDC or more. In "Residual voltage measurement", which is one evaluation item of this electric shock protection performance test, the residual voltage of high-voltage components after 5 to 60 seconds from a collision should be 30 VAC or less, or 60 VDC or less.

The rated voltage 48 V of the battery 18 is lower than the predetermined voltage (referred to below as the regulated voltage) 60 V defined as the high voltage by JNCAP, so this rated voltage has no risk associated with the high voltage. In contrast, the rated voltage 72 V of the capacitor 22 is higher than the regulated voltage 60 V, so this rated voltage is regulated as a high-voltage component by JNCAP. It should be noted here that the rated voltage of the battery 18 means the maximum value of the operating voltage under general conditions and the rated voltage of the capacitor 22 represents the maximum voltage given to the capacitor 22 in this specification. In addition, the average operating voltage when a battery is discharged under general conditions is referred to as the nominal voltage of the battery. In addition, although the rated voltage of the battery 18 is set to a value lower than the rated voltage of the capacitor 22, the electric charge (coulomb) storable in the battery 18 is more than the electric charge storable in the capacitor 22.

Since the rated voltage of the battery 18 is set to a value lower than the regulated voltage in the embodiment, the battery 18 solely is not regulated as a high-voltage component. In contrast, since the voltage between the negative terminal of the battery 18 and the positive terminal of the capacitor 22 exceeds the regulated voltage when the battery 18 and the capacitor 22 are connected in series, the components are restricted as high-voltage components.

In addition, since the voltage (voltage between the negative electrode of the battery 18 and the positive electrode of the capacitor 22) of the capacitor 22 connected in series to the battery 18 is equal to or more than the lower limit voltage above which charge by the external power supply 17 is enabled, the external power supply 17 can directly charge the battery 18 and the capacitor 22. Accordingly, as illustrated in FIG. 2, during charge by the external power supply 17, the DC current from the external power supply 17 flows to the capacitor 22 and the battery 18 and charges the capacitor 22 and the battery 18. In addition, the charging device 19 is connected to the capacitor 22 and the battery 18, respectively, to control the charge of the capacitor 22 and the battery 18. The specific structure and operation of the charging device 19 will be described later.

It should be noted here that the charging device 19 may have a DC-to-DC converter so as to lower the voltage of the electric charge stored in the capacitor 22 and charge the battery 18 with the voltage or raise the voltage of the electric charge stored in the battery 18 and charge the capacitor 22 with the voltage. Since the charging device 19 has the DC-to-DC converter connected to the battery 18 and the capacitor 22 as described above, electric charge can be exchanged between the battery 18 and the capacitor 22. This can rapidly charge the battery 18 by lowering the voltage of the electric charge stored in the capacitor 22 while suppressing the degradation of the battery 18 when the vehicle 1 collides and the inter-terminal voltage of the capacitor 22 can be lowered.

Next, as illustrated in FIG. 3, electric power is supplied via different paths to drive the main driving motor 16 and the sub-driving motors 20. First, since the main driving motor 16 is driven by a relatively low voltage of about 48 V, electric power is directly supplied from the battery 18 to the inverter 16*a* for the main driving motor 16. That is, the positive terminal and the negative terminal of the battery 18 are connected to the inverter 16*a* and the DC voltage of the battery 18 is applied to the inverter 16*a*. In contrast, since the sub-driving motors 20 are driven by a relatively high voltage of about 120 V, electric power is supplied from the battery 18 and the capacitor 22 to the inverter 20*a* for the sub-driving motors 20. That is, the positive terminal of the capacitor 22 and the negative terminal of the battery 18 are connected to the inverter 20*a* and the total of the voltage of the battery 18 and the voltage of the capacitor 22 is applied to the inverter 20*a*. In addition, when the electric charge of the capacitor 22 is discharged and the inter-terminal of the capacitor 22 is lowered, the capacitor 22 is charged with the electric charge stored in the battery 18 by the charging device 19. With this, the inter-terminal voltage of the capacitor 22 is raised and the voltage required to drive the sub-driving motors 20 is obtained. On the other hand, the electric power obtained by lowering the output voltage of the battery 18 through a DC-to-DC converter 26 is supplied to a 12-V system vehicle-mounted device 28 installed in the vehicle 1.

In addition, as illustrated in FIG. 4, the electric charge stored in the capacitor 22 is discharged by the charging device 19 when the vehicle 1 collides, the battery 18 is charged with the discharged electric charge, and the inter-terminal voltage of the capacitor 22 is lowered. Accordingly, in the embodiment, the charging device 19 functions as a capacitor discharging device that discharges the electric charge stored in the capacitor 22 and charges the battery 18 with the discharged electric charge.

When the vehicle 1 is braked, the kinetic energy of the vehicle 1 is regenerated by the main driving motor 16 to generate electric power. The output voltage from the main driving motor 16 is applied between the positive terminal and the negative terminal of the battery 18 and the battery 18 is charged. In addition, when the vehicle 1 is braked, the sub-driving motors 20 also perform regeneration to generate electric power. The output voltages from the sub drive motors 20 are applied between the positive terminal of the capacitor 22 and the negative terminal of the battery 18, and the battery 18 and the capacitor 22 are charged. When the electric power regenerated by the sub-driving motors 20 is large and the inter-terminal of the capacitor 22 is raised to a predetermined value or more, the electric charge stored in the capacitor 22 is also discharged and the battery 18 is charged with the electric charge as illustrated in FIG. 4.

Next, the specific structure and operation of the vehicle power supply system 10 according to the first embodiment of the present disclosure will be described with reference to FIGS. 5 to 11.

Figure 5:
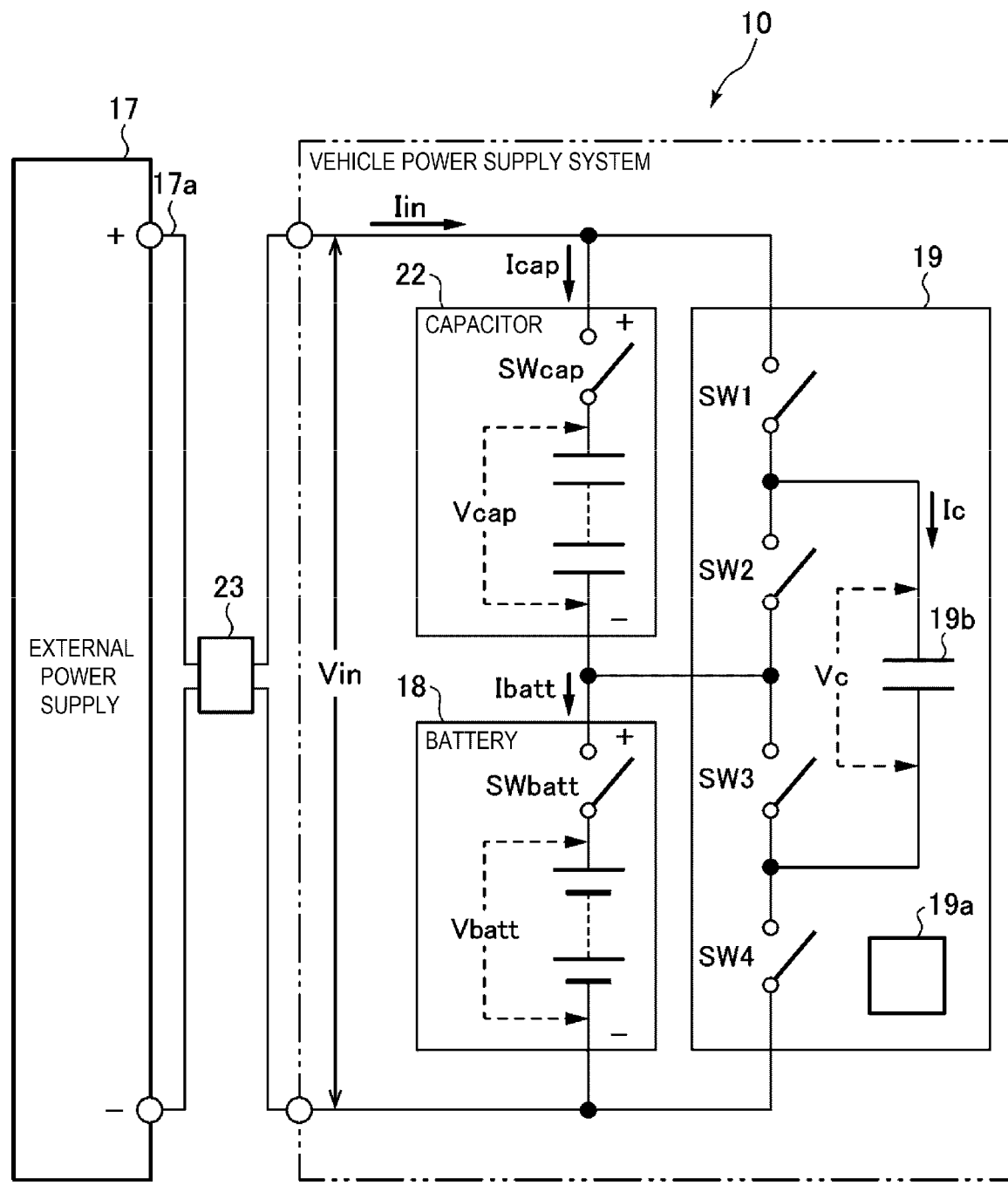
FIG. 5 illustrates the circuit of the vehicle power supply system according to the first embodiment of the present disclosure.
Figure 6:
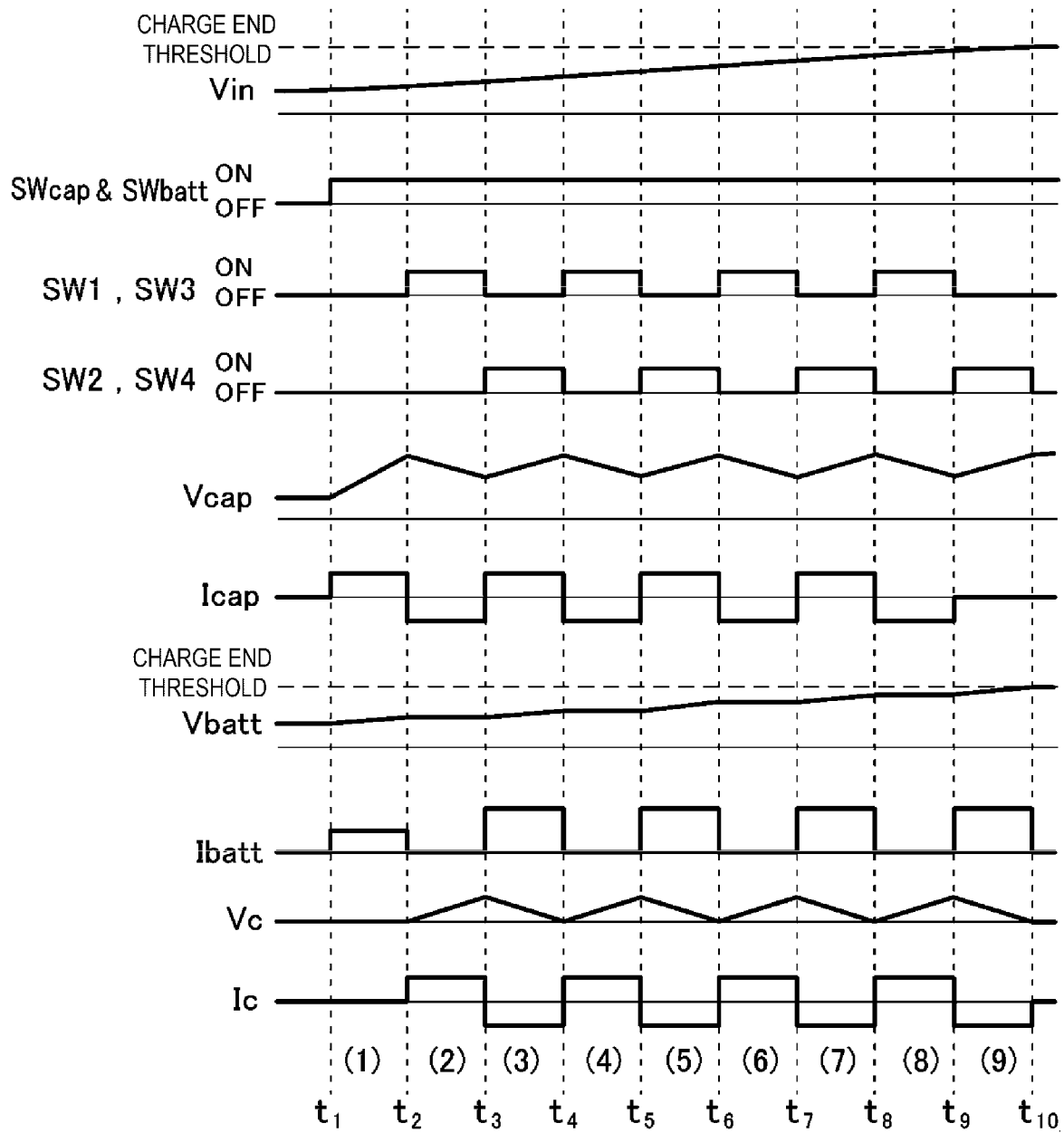
FIG. 6 is a time chart illustrating the operation when the vehicle power supply system according to the first embodiment of the present disclosure is charged by the external power supply.
Figure 7:
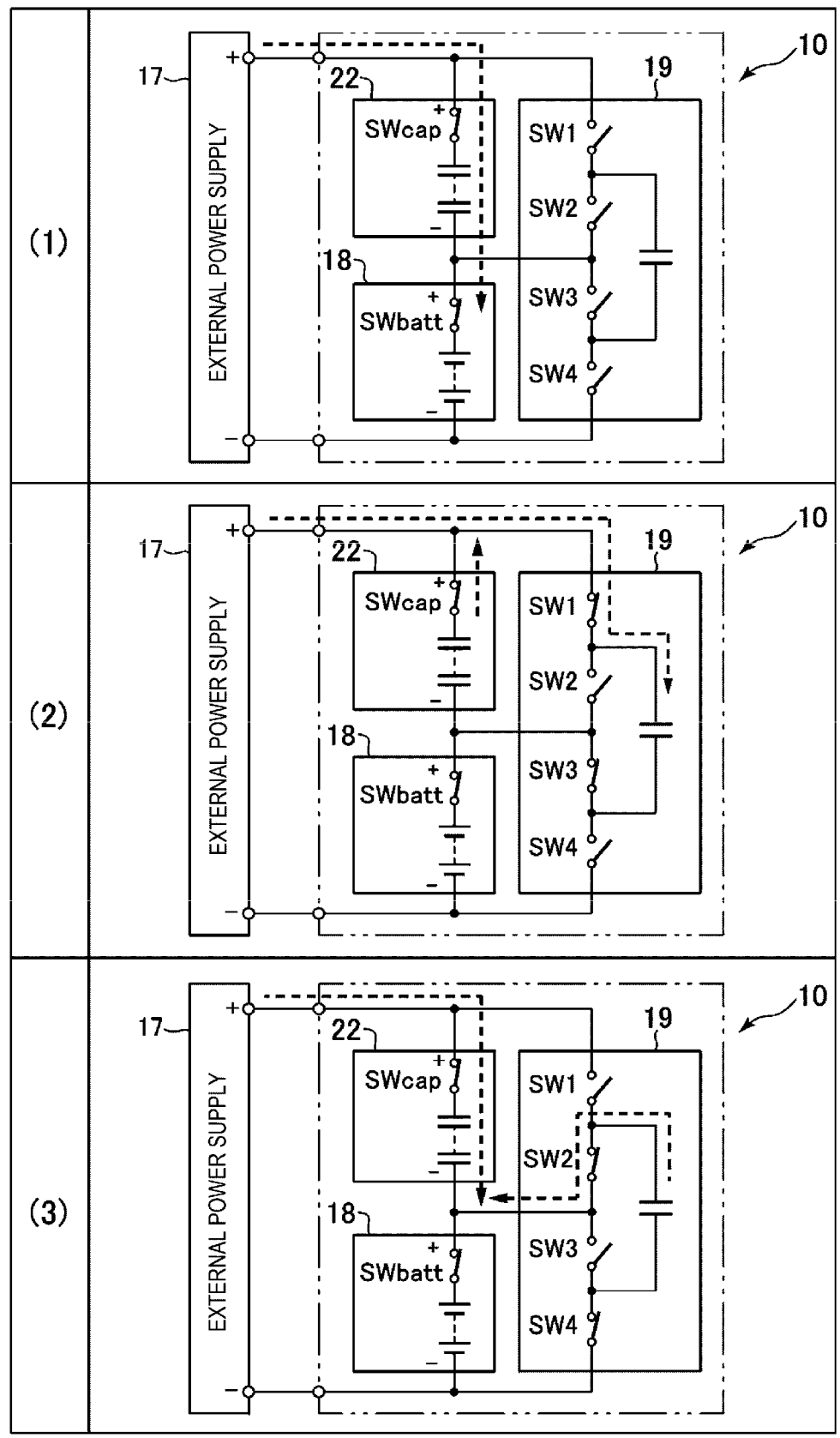
FIG. 7 illustrates the state of the circuit when the vehicle power supply system according to the first embodiment of the present disclosure is charged by the external power supply.
Figure 8:
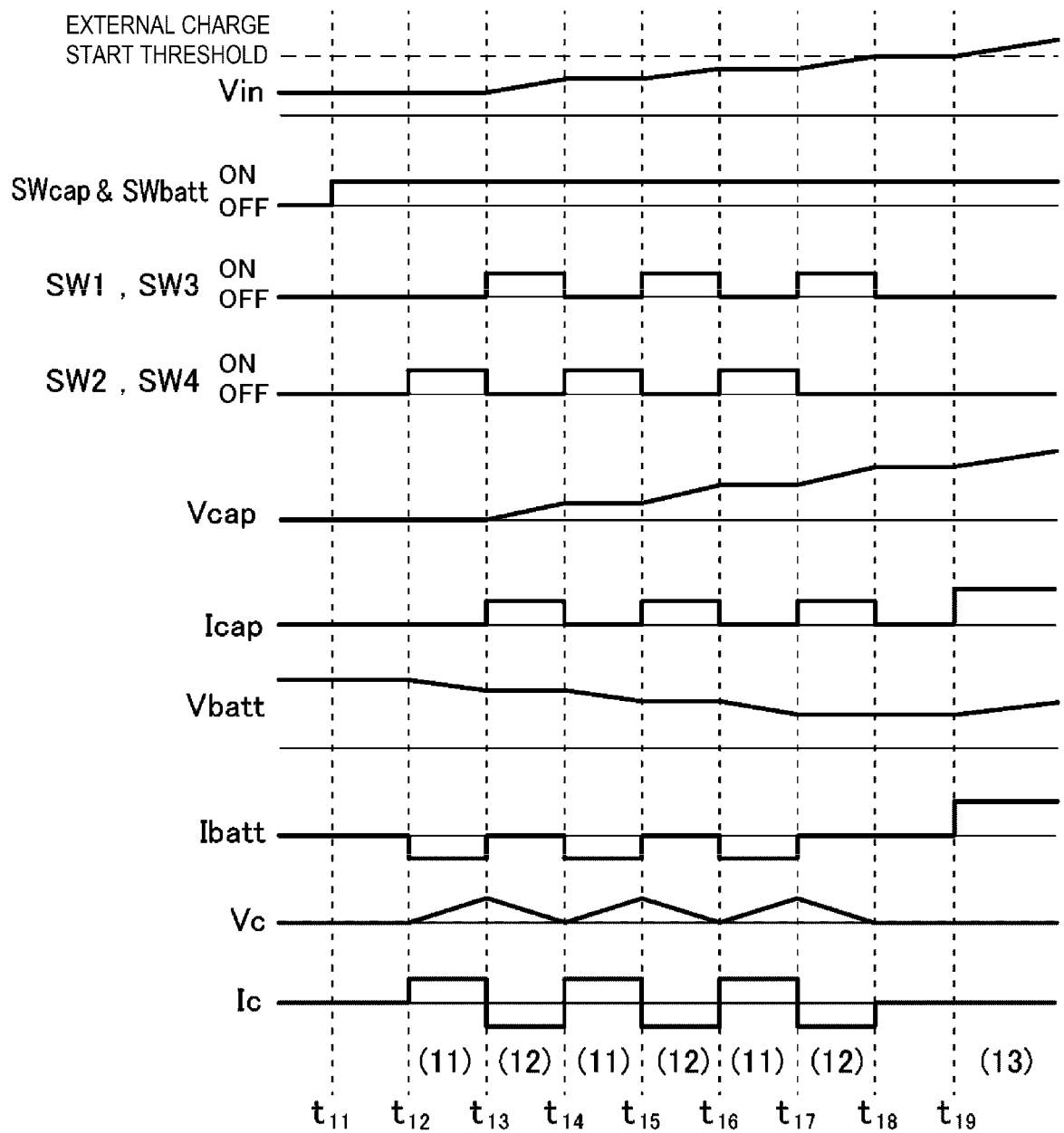
FIG. 8 is a time chart illustrating the operation when a capacitor is charged in the vehicle power supply system according to the first embodiment of the present disclosure.
Figure 9:
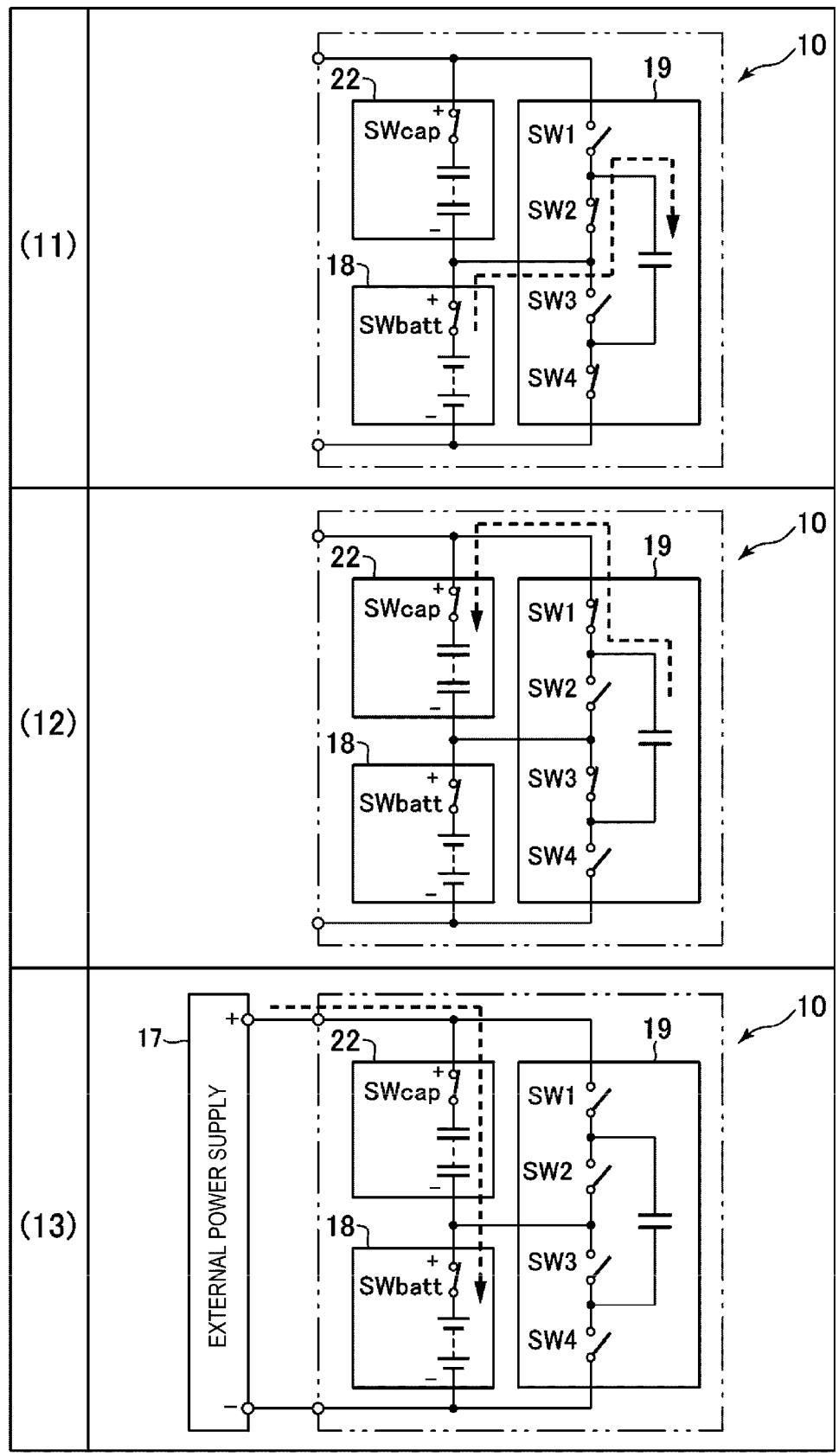
FIG. 9 illustrates the state of the circuit when the capacitor is charged in the vehicle power supply system according to the first embodiment of the present disclosure.
Figure 10:
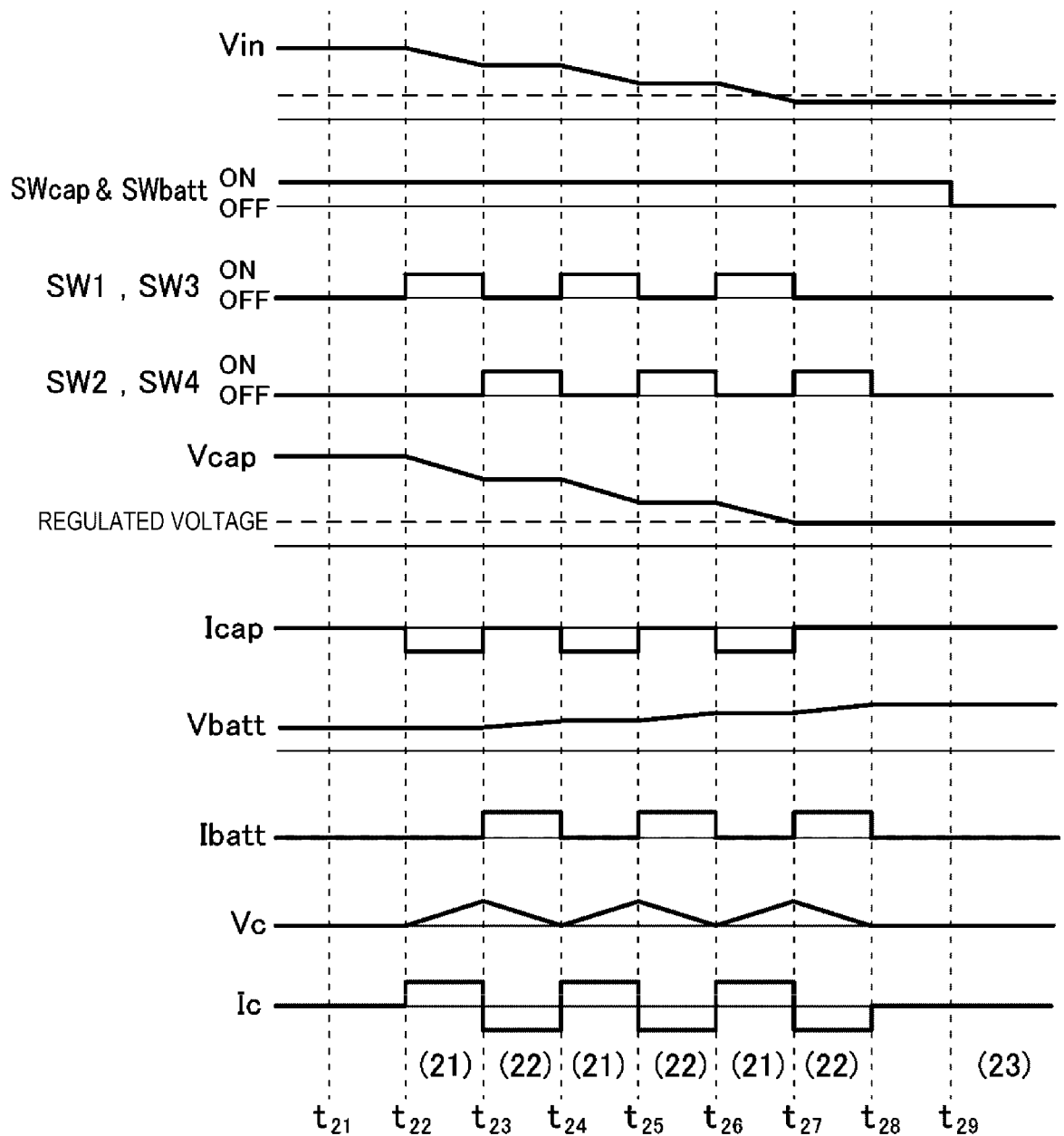
FIG. 10 is a time chart illustrating the operation for charging the battery with the electric charge of the capacitor at the time of a collision in the vehicle power supply system according to the first embodiment of the present disclosure.
Figure 11:
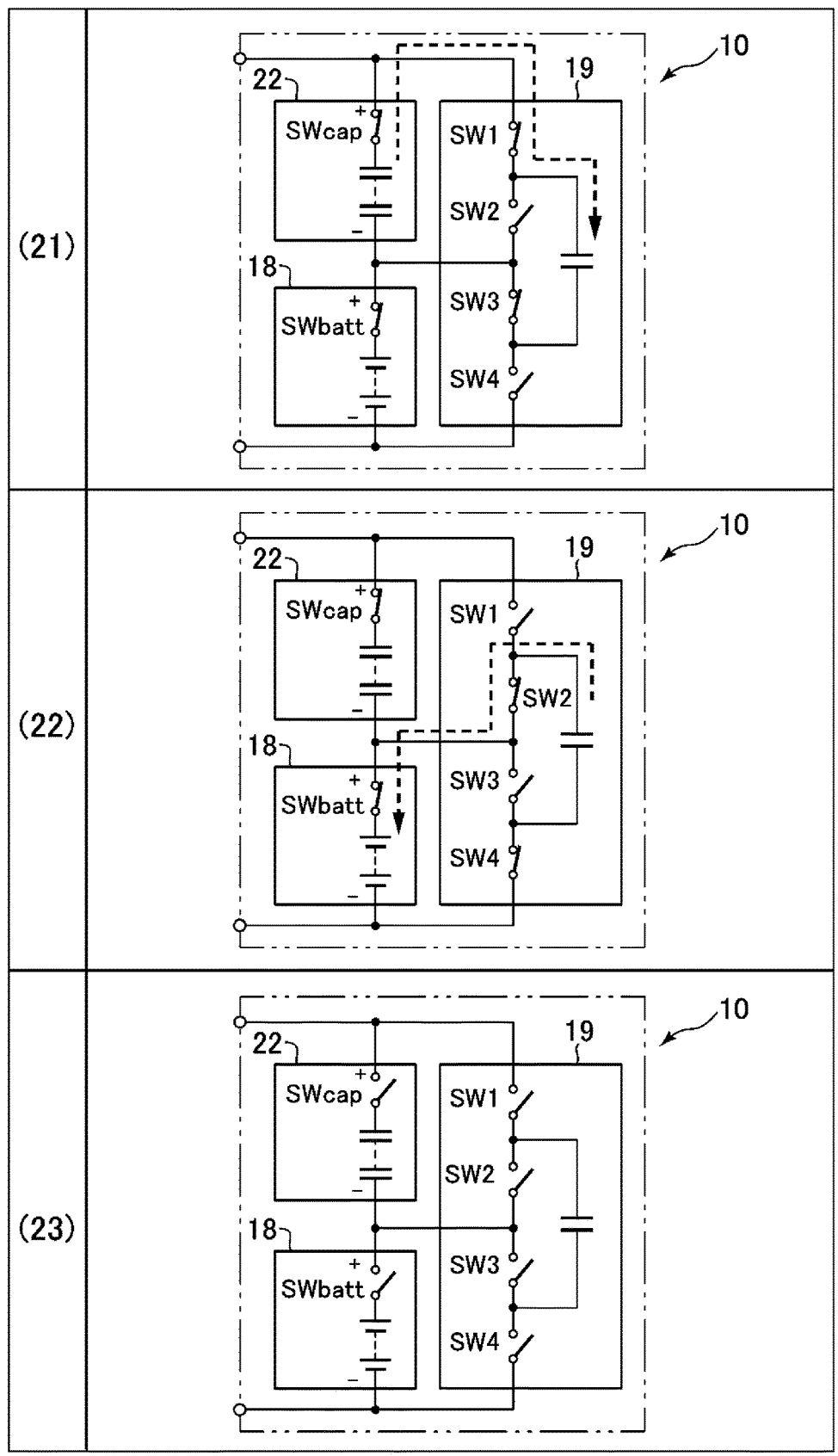
FIG. 11 illustrates the state of the circuit when the battery is charged with the electric charge of the capacitor at the time of a collision in the vehicle power supply system according to the first embodiment of the present disclosure.

FIG. 5 illustrates the circuit of the vehicle power supply system 10 according to the embodiment. FIG. 6 is a time chart illustrating the operation when the vehicle power supply system 10 according to the embodiment is charged by the external power supply. FIG. 7 illustrates the state of the circuit when the vehicle power supply system 10 according to the embodiment is charged by the external power supply. FIG. 8 is a time chart illustrating the operation when the capacitor is charged in the vehicle power supply system 10 according to the embodiment. FIG. 9 illustrates the state of the circuit when the capacitor is charged in the vehicle power supply system 10 according to the embodiment. FIG. 10 is a time chart illustrating the operation when the battery is charged with the electric charge of the capacitor at the time of a collision in the vehicle power supply system 10 according to the embodiment. FIG. 11 illustrates the state of the circuit when the battery is charged with the electric charge of the capacitor at the time of a collision in the vehicle power supply system 10 according to the embodiment.

As illustrated in FIG. 5, the vehicle power supply system 10 according to the embodiment is connected to the electric cable 17*a* of the external power supply 17 via the power feeding port 23 so that the vehicle power supply system 10 can be charged by the external power supply 17. In addition, the vehicle power supply system 10 includes the battery 18, the capacitor 22, and the charging device 19 and the battery 18 and the capacitor 22 are charged with electric power from the external power supply 17. In addition, since the charging device 19 discharges the electric charge of the capacitor 22 and charges the battery 18 with the discharged electric charge when the vehicle collides in the vehicle power supply system 10 according to the embodiment, the charging device 19 functions as a capacitor discharging device.

In addition, as described above, the battery 18 and the capacitor 22 are electrically connected in series by connecting the positive terminal of the battery 18 to the negative terminal of the capacitor 22. In addition, a switch SWbatt is connected to the positive terminal of the battery 18 and a switch SWcap is connected to the positive terminal of the capacitor 22 so as to switch between the connection and disconnection of the battery 18 and the capacitor 22.

The charging device 19 is connected in parallel to the battery 18 and the capacitor 22 connected in series. In addition, the charging device 19 includes four switches connected in series in the following order: switches SW1, SW2, SW3, and SW4. One end of the switch SW1 is connected to the positive terminal of the capacitor 22 and one end of the switch SW4 is connected to the negative terminal of the battery 18. In addition, the connection point between the switches SW2 and SW3 is connected to the connection point between the battery 18 and the capacitor 22. The opening and closing of the switches SW1 to SW4 and the switches SWbatt and SWcap provided in the battery 18 and capacitor 22 are controlled by a charge controller 19a included in the charging device 19. Specifically, the charge controller 19a, which is a controller, may include a microprocessor, a memory, an interface circuit, programs for operating these components (not illustrated), and the like. In addition, a charge capacitor 19b is connected between the connection point between the switches SW1 and SW2 and the connection point between the switches SW3 and SW4. It should be noted here that semiconductor switches are adopted as these switches in the embodiment, but relays having mechanical contacts may also be used as these switches.

Next, the charging of the battery 18 and the capacitor 22 by the external power source 17 will be described with reference to FIGS. 6 and 7. It should be noted here that FIG. 6 and FIG. 7 illustrate the case in which the total of the inter-terminal voltage of the battery 18 and the inter-terminal voltage of the capacitor 22 is equal to or more than the lower limit voltage above which charge by the external power supply 17 is enabled.

FIG. 6 is a time chart illustrating the operation of the vehicle power supply system 10 when the external power supply 17 charges the battery 18 and the capacitor 22. FIG. 6 illustrates, from the top, the voltage Vin input from the external power supply 17, the open-close states of the switches SWbatt and SWcap, the open-close states of the switches SW1 and SW3, and the open-close states of the switches SW2 and SW4. FIG. 6 further illustrates an inter-terminal voltage Vcap (voltage between the positive terminal and the negative terminal of the capacitor 22) of the capacitor 22, current Icap flowing through the capacitor 22, an inter-terminal voltage Vbatt of the battery 18, current Ibatt flowing through the battery 18, the inter-terminal voltage Vc of the charge capacitor 19b, and current Ic flowing through the charge capacitor 19b.

FIG. 7 illustrates the states of the switches and a flow of current when the external power supply 17 charges the battery 18 and the capacitor 22. The switches are sequentially set to the state of stage (1) illustrated in the upper part, the state of stage (2) illustrated in the middle part, and the state of stage (3) illustrated in the lower part in FIG. 7 during charge by the external power supply 17.

First, when the external power supply 17 starts charge at time $t_1$ in FIG. 6, the charge controller 19a turns on (closed state) the switches SWbatt and SWcap and turns off (open state) the switches SW1 to SW4. This puts the vehicle power supply system 10 in the state of stage (1) illustrated in the upper part of FIG. 7. In this state, the battery 18 and the capacitor 22 are connected to the external power supply 17 and the charging device 19 is disconnected from the external power supply 17. With this, the current supplied from the external power supply 17 flows into the capacitor 22 and the battery 18 (current Icap and current Ibatt>0) to charge the capacitor 22 and the battery 18. The inter-terminal voltage Vcap of the capacitor 22 and the inter-terminal voltage Vbatt of the battery 18 are raised accordingly. Since the electric charge storable in the capacitor 22 is less than the electric charge storable in the battery 18, the inter-terminal voltage Vcap of the capacitor 22 increases more immediately than the inter-terminal voltage Vbatt of the battery 18. Therefore, the inter-terminal voltage Vcap of the capacitor 22 is raised close to the rated voltage of the capacitor 22 at time $t_2$.

When the inter-terminal voltage Vcap of the capacitor 22 is raised, the charge controller 19a turns on the switches SW1 and SW3 at time $t_2$ (the switches SWbatt and SWcap stay on and the switches SW2 and SW4 stay off). This puts the vehicle power supply system 10 in the state of stage (2) illustrated in the middle part in FIG. 7. In this state, the current from the external power supply 17 flows into the charge capacitor 19b of the charging device 19 and the electric charge stored in the capacitor 22 is discharged (current Icap<0) and then flows into the charge capacitor 19b (current Ic>0). This raises the inter-terminal voltage Vc of the charge capacitor 19b and lowers the inter-terminal voltage Vcap of the capacitor 22. This puts the capacitor 22 in a chargeable state again. It should be noted here that the voltage that is the total of the inter-terminal voltage Vbatt of the battery 18 and the inter-terminal voltage Vcap of the capacitor 22 is kept at a voltage equal to or higher than the lower limit voltage above which charge by the external power supply 17 is enabled even in the state at time $t_3$ in which the voltage of the capacitor 22 is lowered.

When the inter-terminal voltage Vc of the charge capacitor 19b is raised to a predetermined voltage, the charge controller 19a turns off the switches SW1 and SW3 and turns on the switches SW2 and SW4 at time $t_3$ (the switches SWbatt and SWcap stay on). This puts the vehicle power supply system 10 in the state of stage (3) illustrated in the lower part in FIG. 7. In this state, the current from the external power supply 17 flows into the capacitor 22 and the battery 18 to charge the capacitor 22 and the battery 18. In addition, the electric charge stored in the charge capacitor 19b also passes through the switches SW2 and SWbatt to charge the battery 18. This raises the inter-terminal voltage Vcap of the capacitor 22 and the inter-terminal voltage Vbatt of the battery 18 and lowers the inter-terminal voltage Vc of the charge capacitor 19b.

When the inter-terminal voltage Vcap of the capacitor 22 is raised close to the rated voltage, the charge controller 19a puts the vehicle power supply system 10 in the state of stage (2) illustrated in the middle part in FIG. 7 again by switching the switches at time $t_4$. In this state, the inter-terminal voltage Vcap of the capacitor 22 is lowered and the inter-terminal voltage Vc of the charge capacitor 19b is raised (the inter-terminal voltage Vbatt of the battery 18 is substantially constant). Next, the charge controller 19a switches the switches to the state of stage (3) illustrated in the lower part in FIG. 7 at time $t_5$, raises the inter-terminal voltages of the capacitor 22 and the battery 18, and lowers the inter-terminal voltage Vc of the charge capacitor 19b. After that, the charge controller 19a alternately switches between the state of stage (2) and the state of stage (3) and raises the inter-terminal voltage Vbatt of the battery 18 (charges the battery 18). When the inter-terminal voltage Vbatt of the battery 18 is raised to a charge end threshold and the inter-terminal voltage Vcap of the capacitor 22 is raised close to the rated voltage, the charge controller 19a ends the charge of the capacitor 22 and the battery 18.

Next, charging of the capacitor 22 with the electric charge stored in the battery 18 will be described with reference to FIGS. 8 and 9. It should be noted here that the operation illustrated in FIG. 8 and FIG. 9 is performed to enable charge by the external power supply 17 when the total of the inter-terminal voltage of the battery 18 and the inter-terminal voltage of the capacitor 22 is lowered to a value less than the lower limit voltage above which charge by the external power supply 17 is enabled. That is, since charge by the external power supply 17 is disabled when the total of the inter-terminal voltages of the battery 18 and the capacitor 22 is lowered to a value less than the lower limit voltage, the inter-terminal voltage is raised by charging the capacitor 22 to enable charge by the external power supply 17. In addition, the operation illustrated in FIGS. 8 and 9 is also performed to raise the inter-terminal voltage of the capacitor 22 when the electric charge stored in the capacitor 22 is lowered while the vehicle 1 is traveling. That is, since the voltage necessary to drive the sub-driving motors 20 cannot be obtained when the electric charge stored in the capacitor 22 is reduced during travel and the inter-terminal voltage is lowered, the necessary voltage is recovered by charging the capacitor 22.

FIG. 8 is a time chart illustrating the operation of the vehicle power supply system 10 when the battery 18 charges the capacitor 22. FIG. 8 illustrates, from the top, the total Vin of the inter-terminal voltages of the battery 18 and the capacitor 22, the open-close states of the switches SWbatt and SWcap, the open-close states of the switches SW1 and SW3, and the open-close states of the switches SW2 and SW4. FIG. 8 further illustrates the inter-terminal voltage Vcap of the capacitor 22, the current Icap flowing through the capacitor 22, the inter-terminal voltage Vbatt of the battery 18, the current Ibatt flowing through the battery 18, the inter-terminal voltage Vc of the charge capacitor 19b, and the current Ic flowing through the charge capacitor 19b.

FIG. 9 illustrates the states of the switches and a flow of current when the capacitor 22 is charged with the electric charge of the battery 18. The switches are sequentially set to the state of stage (11) illustrated in the upper part, the state of stage (12) illustrated in the middle part, and the state of stage (13) illustrated in the lower part in FIG. 9 while the capacitor 22 is charged.

First, at time $t_{11}$ in FIG. 8, since the total Vin of the inter-terminal voltages of the battery 18 and the capacitor 22 is less than the lower limit voltage, the capacitor 22 is charged to increase the total voltage. The charge controller 19a turns on (closed state) the switches SWbatt and SWcap at time $t_{11}$ to start the charge of the capacitor 22. In addition, the charge controller 19a turns on the switches SW2 and SW4 at time $t_{12}$ (the switches SW1 and SW3 stay off (open state)). This puts the vehicle power supply system 10 in the state of stage (11) illustrated in the upper part in FIG. 9. In this state, the current (Ibatt<0) output from the battery 18 flows into the charge capacitor 19b of the charging device 19 (Ic>0) via the switch SWbatt and the switch SW2. This raises the inter-terminal voltage Vc of the charge capacitor 19b. In contrast, although the inter-terminal voltage Vbatt of the battery 18 is reduced, the amount of reduction is slight because sufficient electric charge is stored in the battery 18.

When the inter-terminal voltage Vc of the charge capacitor 19b is raised to a predetermined voltage, the charge controller 19a turns on the switches SW1 and SW3 at time $t_{13}$ and turns off the switches SW2 and SW4 (the switches SWbatt and SWcap stay on) at time $t_{13}$. This puts the vehicle power supply system 10 in the state of stage (12) illustrated in the middle part in FIG. 9. In this state, the current (current Ic<0) discharged from the charge capacitor 19b of the charging device 19 flows into the capacitor 22 (current Icap>0). This lowers the inter-terminal voltage Vc of the charge capacitor 19b and raises the inter-terminal voltage Vcap of the capacitor 22 (the inter-terminal voltage Vbatt of the battery 18 does not change). As a result, the total Vin of the inter-terminal voltages of the capacitor 22 and the battery 18 is raised.

When the inter-terminal voltage Vc of the charge capacitor 19b is lowered to a predetermined voltage, the charge controller 19a turns off the switches SW1 and SW3 and turns on the switches SW2 and SW4 at time $t_{14}$ (the switches SWbatt and SWcap stay on). This returns the vehicle power supply system 10 to the state of stage (11) illustrated in the upper part in FIG. 9. In this state, the current from the battery 18 flows into the charge capacitor 19b to charge the charge capacitor 19b as described above. This raises the inter-terminal voltage Vc of the charge capacitor 19b and slightly lowers the inter-terminal voltage Vbatt of the battery 18.

When the inter-terminal voltage Vc of the charge capacitor 19b is lowered to a predetermined voltage, the charge controller 19a puts the vehicle power supply system 10 in the state of stage (12) illustrated in the middle part in FIG. 9 again by switching the switches at time $t_{15}$. In this state, the inter-terminal voltage Vc of the charge capacitor 19b is lowered and the inter-terminal voltage Vcap of the capacitor 22 is raised (the inter-terminal voltage Vbatt of the battery 18 is substantially constant). As a result, the total Vin of the inter-terminal voltages of the capacitor 22 and the battery 18 is further raised. After that, the charge controller 19a alternately switches between the state of stage (11) and the state of stage (12) to raise the inter-terminal voltage Vcap of the capacitor 22 and the total Vin of the inter-terminal voltages of the capacitor 22 and the battery 18 (charge the capacitor 22). That is, the electric charge stored in the battery 18 is discharged and supplied to the capacitor 22 by alternately repeating stage (11) and stage (12) in FIG. 9, and the inter-terminal voltage Vcap of the capacitor 22 is raised. In contrast, although the electric charge of the battery 18 is discharged, reduction in the inter-terminal voltage of the battery 18 is slight because the capacity of the battery 18 is sufficiently large. Accordingly, the total Vin of the inter-terminal voltages of the capacitor 22 and the battery 18 can be raised by charging the capacitor 22 with the electric charge of the battery 18.

When the total of the inter-terminal voltages of the capacitor 22 and the battery 18 reaches an external charge start threshold at time $t_{18}$ in FIG. 8, the charge controller 19a starts charge from the external power supply 17 at time $t_{19}$. It should be noted here that the external charge start threshold is set to a value equal to or more than the lower limit voltage above which charge by the external power supply 17 is enabled. That is, the charge controller 19a turns on the switches SWbatt and SWcap and turns off the switches SW1 to SW4 at time $t_{19}$ to put the vehicle power supply system 10 in the state of stage (13) illustrated in the lower part in FIG. 9. With this, the current supplied from the external power supply 17 flows into the capacitor 22 and the battery 18, and the inter-terminal voltages of the capacitor 22 and the battery 18 are raised. It should be noted here that a shift is made to the operation described in FIGS. 6 and 7 when the inter-terminal voltage Vcap of the capacitor 22 reaches a predetermined voltage after time $t_{19}$ to charge the battery 18.

The operation described with reference to FIGS. 8 and 9 above is performed to raise the total of the inter-terminal voltages of the capacitor 22 and the battery 18 to a voltage equal to or more than the lower limit voltage above which charge from the external power supply is enabled. However, the operation described with reference to FIGS. 8 and 9 is also performed when the total of the inter-terminal voltages of the capacitor 22 and the battery 18 is raised to apply a necessary voltage to the sub-driving motors 20. In this case, the operation described with reference to FIG. 8 and FIG. 9 is also performed when the total of the inter-terminal voltages of the capacitor 22 and the battery 18 is higher than the lower limit voltage.

Next, the discharge of the capacitor 22 when the vehicle 1 collides will be described with reference to FIGS. 10 and 11. That is, the inter-terminal voltage of the capacitor 22 is lowered to a predetermined voltage or less to prevent an electric shock by discharging the electric charge stored in the capacitor 22 and charging the battery 18 with the discharged electric charge. By setting this predetermined voltage to the regulated voltage (60 V) defined by JNCAP or lower, the demand by JNCAP can be met. In addition, the predetermined voltage can be set to various voltages based on high-voltage regulations of various countries. It should be noted here that the operation illustrated in FIGS. 10 and 11 is also performed when the inter-terminal voltage of the capacitor 22 is raised close to the rated voltage by charging the capacitor 22 with the electric power regenerated by the sub-driving motors 20. That is, when the inter-terminal voltage of the capacitor 22 is raised to the rated voltage or higher, the capacitor 22 may be degraded. Accordingly, the regenerated electric power is used effectively by charging the battery 18 with the electric charge stored in the capacitor 22.

FIG. 10 is a time chart illustrating the operation of the vehicle power supply system 10 that discharges the electric charge of the capacitor 22 and charges the battery 18 with the electric charge at the time of a collision. FIG. 10 illustrates, from the top, the total Vin of the inter-terminal voltages of the battery 18 and the capacitor 22, the open-close states of the switches SWbatt and SWcap, the open-close states of the switches SW1 and SW3, and the open-close states of the switches SW2 and SW4. FIG. 10 further illustrates the inter-terminal voltage Vcap of the capacitor 22, the current Icap flowing through the capacitor 22, the inter-terminal voltage Vbatt of the battery 18, the current Ibatt flowing through the battery 18, the inter-terminal voltage Vc of the charge capacitor 19b, and the current Ic flowing through the charge capacitor 19b.

FIG. 11 illustrates the states of the switches and a flow of current when the battery 18 is charged with the electric charge discharged from the capacitor 22. The switches are sequentially set to the state of stage (21) illustrated in the upper part in FIG. 11, the state of stage (22) illustrated in the middle part, and the state of stage (23) illustrated in the lower part during discharge from the capacitor 22.

As described above, the control device 24 (FIG. 1) determines whether the vehicle has collided based on the detection signals from the longitudinal acceleration sensor 24a and the lateral acceleration sensor 24b. That is, when the acceleration detected by the longitudinal acceleration sensor 24a or the lateral acceleration sensor 24b exceeds a predetermined threshold, the control device 24 determines that the vehicle 1 has collided. When determining that the vehicle 1 has collided, the control device 24 transmits a deployment signal to the air bag (not illustrated) installed in the vehicle 1 to deploy the air bag. This air bag deployment signal is also transmitted to the charge controller 19a of the charging device 19 to cause the charge controller 19a, which is a control device, to discharge the electric charge of the capacitor 22 by controlling the charging device 19 that functions as a capacitor discharging device.

First, when receiving the air bag deployment signal at time $t_{21}$ in FIG. 10, the charge controller 19a needs to lower the inter-terminal voltage Vcap of the capacitor 22 since the inter-terminal voltage Vcap of the capacitor 22 is higher than a predetermined voltage. Accordingly, the charge controller 19a discharges the electric charge stored in the capacitor 22 to lower the voltage of the capacitor 22 to a predetermined voltage or less, and charges the battery 18 with the discharged electric charge to lower the inter-terminal voltage Vcap of the capacitor 22. The charge controller 19a turns on the switches SW1 and SW3 at time $t_{22}$ (the switch SWbatt and the SWcap stay on (closed state) and the switches SW2 and SW4 stay off (open state)). This puts the vehicle power supply system 10 in the state of stage (21) illustrated in the upper part in FIG. 11. In this state, the current (Icap<0) discharged from the capacitor 22 flows into the charge capacitor 19b of the charging device 19 (Ic>0) via the switch SWcap and the switch SW1. This raises the inter-terminal voltage Vc of the charge capacitor 19b and lowers the inter-terminal voltage Vcap of the capacitor 22.

When the inter-terminal voltage Vc of the charge capacitor 19b is raised to a predetermined voltage, the charge controller 19a turns on the switches SW2 and SW4 at time $t_{23}$ and turns off the switches SW1 and SW3 (the switches SWbatt and SWcap stay on). This puts the vehicle power supply system 10 in the state of stage (22) illustrated in the middle part in FIG. 11. In this state, the current (current Ic<0) discharge from the charge capacitor 19b of the charging device 19 flows into the battery 18 (current Ibatt>0). This lowers the inter-terminal voltage Vc of the charge capacitor 19b and slightly raises the inter-terminal voltage Vbatt of the battery 18 (the inter-terminal voltage Vcap of the capacitor 22 does not change).

When the inter-terminal voltage Vc of the charge capacitor 19b is lowered to a predetermined voltage, the charge controller 19a turns on the switches SW1 and SW3 and turns off the switches SW2 and SW4 at time $t_{24}$ (the switches SWbatt and SWcap stay on). This returns the vehicle power supply system 10 to the state of stage (21) illustrated in the upper part in FIG. 11. In this state, the current from the capacitor 22 flows into the charge capacitor 19b to charge the charge capacitor 19b as described above. This raises the inter-terminal voltage Vc of the charge capacitor 19b and lowers the inter-terminal voltage Vcap of the capacitor 22.

When the inter-terminal voltage Vc of the charge capacitor 19b is lowered to a predetermined voltage, the charge controller 19a switches the switches at time $t_{25}$ and puts the vehicle power supply system 10 in the state of stage (22) illustrated in the middle part in FIG. 11 again. In this state, the inter-terminal voltage Vc of the charge capacitor 19b is lowered and the inter-terminal voltage Vbatt of the battery 18 is raised slightly. After that, the charge controller 19a alternately switches between the state of stage (21) and the state of stage (22), charges the battery 18 with the electric charge stored in the capacitor 22, and lowers the inter-terminal voltage Vcap of the capacitor 22.

That is, the inter-terminal voltage Vcap of the capacitor 22 is lowered to a predetermined voltage (for example, 60 V) or less by repeating stage (21) and stage (22) in FIG. 11. It should be noted here that increase in the inter-terminal voltage Vbatt of the battery 18 when the battery 18 is charged with the electric charge discharged from the capacitor 22 is slight and the inter-terminal voltage Vbatt is kept at the rated voltage of the battery 18 or less.

When the inter-terminal voltage Vcap of the capacitor 22 is lowered to the predetermined voltage or less at time $t_{28}$ in FIG. 10, the charge controller 19a puts the vehicle power supply system 10 in the state of stage (23) illustrated in the lower part in FIG. 11. That is, the charge controller 19a turns off the switches SWbatt and SWcap and turns off the switches SW1 to SW4 at time $t_{29}$. This breaks the connection between the capacitor 22 and the battery 18 electrically connected in series. In this state, the inter-terminal voltage Vcap of the capacitor 22 and the inter-terminal voltage Vbatt of the battery 18 are lowered to the predetermined voltage or less to ensure the safety of occupants against an electric shock. It takes a predetermined time from when the air bag deployment signal (during collision) is received at time $t_{21}$ in FIG. 10 until the connection between the capacitor 22 and the battery 18 is broken at time $t_{29}$, in the embodiment. "Electric shock protection performance test when an electric vehicle etc. collides" of JNCAP defines the residual voltage after 5 to 60 seconds from a collision should be 60 VDC or less. Accordingly, by setting the "predetermined time" to a value, for example, shorter than five seconds, the demand of the "electric shock performance test" can be met surely. In addition, various "predetermined times" can be set based on high-voltage regulations of various countries.

Next, the operation of the charge controller 19a when the capacitor 22 discharges electric charge at the time of a collision of the vehicle 1 will be described with reference to FIG. 12.

Figure 12:
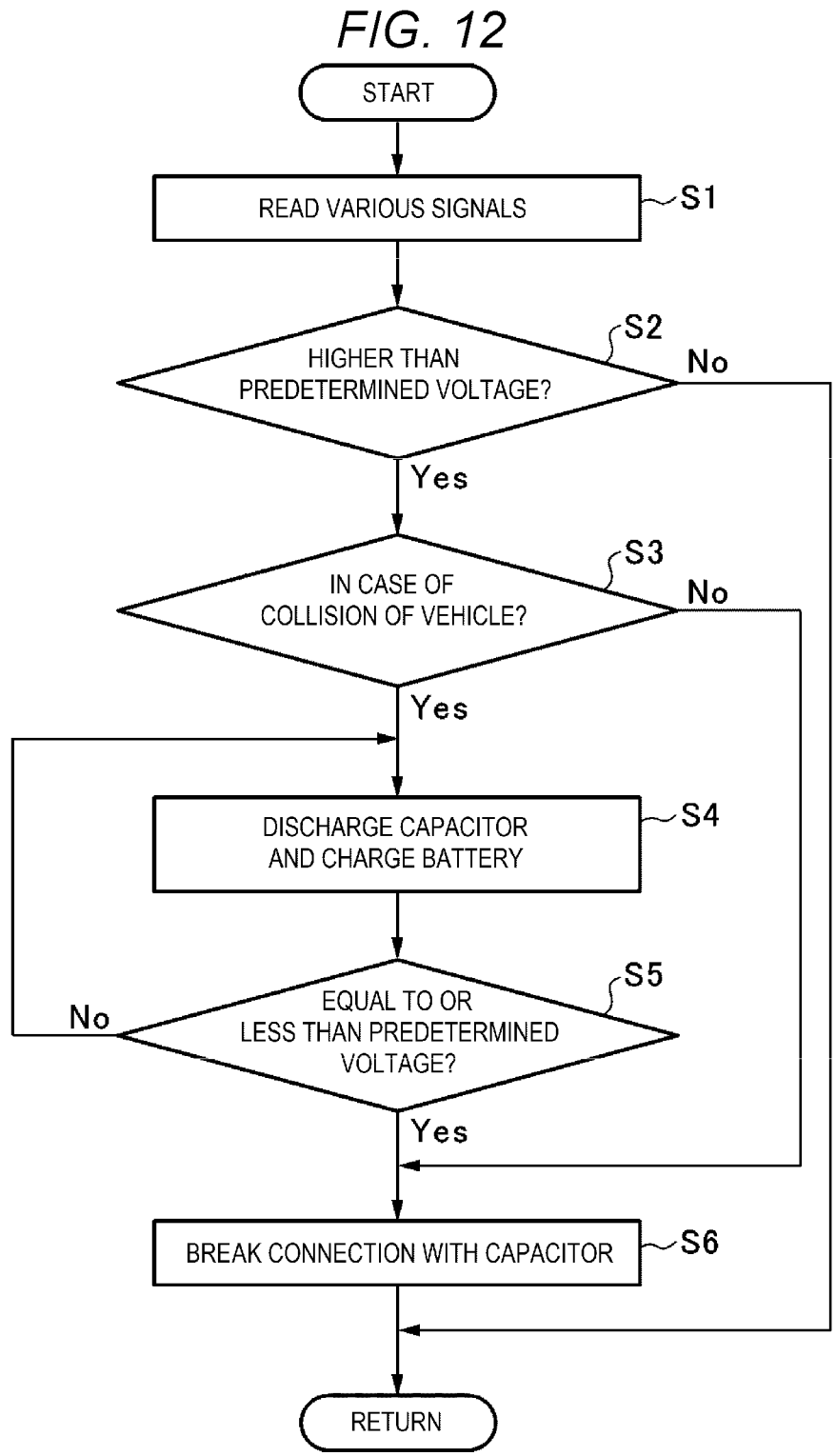
FIG. 12 is a flowchart illustrating control by a charge controller when the electric charge of the capacitor is discharged in the vehicle power supply system according to the first embodiment of the present disclosure.

FIG. 12 is a flowchart illustrating control by the charge controller 19a when the electric charge of the capacitor 22 is discharged. The processing of the flowchart illustrated in FIG. 12 is repeatedly performed at predetermined time intervals by the charge controller 19a while the vehicle power supply system 10 operates.

First, in step S1 in FIG. 12, various detection signals from the sensors installed in the vehicle 1 are read by the charge controller 19a. The detection signals read in step S1 include the inter-terminal voltage Vbatt of the battery 18, the inter-terminal voltage Vcap of the capacitor 22, and the air bag deployment signal transmitted by the control device 24. It should be noted here that the inter-terminal voltages of the battery 18 and the capacitor 22 are also input to the charge controller 19a continuously in chronological order after step S1.

Next, in step S2, a determination is made as to whether the vehicle 1 has collided. That is, when the air bag deployment signal is input from the control device 24, the charge controller 19a determines that the vehicle 1 has collided and performs the processing in step S3 and the subsequent steps to lower the inter-terminal voltage Vcap of the capacitor 22. Alternatively, when the air bag deployment signal is not input, the charge controller 19a determines that the vehicle 1 does not collide, the processing of the flowchart illustrated in FIG. 12 is completed one time. That is, since the vehicle power supply system 10 can operate normally when the vehicle 1 does not collide, the electric charge of the capacitor 22 is not discharged. It should be noted here that the charge controller 19a determines whether a collision of the vehicle 1 has occurred based on the air bag deployment signal in the embodiment. In contrast, in a modification, the present disclosure may be configured to determine whether a collision has occurred by inputting the detection signals of the longitudinal acceleration sensor 24a and the lateral acceleration sensor 24b (FIG. 1) to the charge controller 19a and comparing these signals with predetermined thresholds.

In addition, in step S3, a determination is made as to whether the inter-terminal voltage Vcap of the capacitor 22 input in step S1 is higher than a predetermined voltage. The processing proceeds to step S4 when the inter-terminal voltage Vcap is higher than the predetermined voltage or the processing proceeds to step S6 when the inter-terminal voltage Vcap is equal to or less than the predetermined voltage. In step S6, the charge controller 19a breaks the electric connection between the battery 18 and the capacitor 22 (the state of stage (23) in FIG. 11). That is, when the inter-terminal voltage Vcap of the capacitor 22 is equal to or less than the predetermined voltage even if a collision occurs in the vehicle 1, a high-voltage component having a voltage higher than the predetermined voltage is not present only by breaking the connection between the battery 18 and the capacitor 22.

On the other hand, in step S4, the capacitor 22 is discharged (the state of stage (21) in FIG. 11) to lower the inter-terminal voltage Vcap of the capacitor 22 and the battery 18 is charged (the state of stage (22) in FIG. 11) with the discharged electric charge.

Next, in step S5, a determination is made as to whether the inter-terminal voltage Vcap of the capacitor 22 is equal to or less than the predetermined voltage. When the inter-terminal voltage Vcap is higher than the predetermined voltage, the processing returns to step S4 and the capacitor 22 is discharged and the battery 18 charged again. The processing in step S4 is repeatedly performed until the inter-terminal voltage Vcap is lowered to the predetermined voltage or less. When the inter-terminal voltage Vcap of the capacitor 22 is lowered to the predetermined voltage or less, the processing in step S6 is performed and the processing of the flowchart illustrated in FIG. 12 is completed one time. As described above, in step S6, the electric connection between the battery 18 and the capacitor 22 is broken (the state of stage (23) in FIG. 11) and the voltages of the individual parts of the vehicle power supply system 10 reach the predetermined voltage or less.

In the vehicle power supply system 10 according to the first embodiment of the present disclosure, since the charging device 19, which is a capacitor discharging device, discharges the electric charge stored in the capacitor 22 and the battery 18 is charged with the discharged electric charge (FIGS. 10 and 11) when the vehicle 1 collides, the electric charge stored in the capacitor 22 can be discharged early and surely. Since the battery 18 has a rated voltage lower than the predetermined voltage, even when the battery is charged with the electric charge discharged from the capacitor 22, the voltage is suppressed to the predetermined voltage or less and there is no risk associated with a high voltage.

In addition, in the vehicle power supply system 10 according to the embodiment, since the electric charge storable in the capacitor 22 is less than the electric charge storable in the battery 18, the electric charge stored in the capacitor 22 can be discharged to the battery 18 in a short time. In addition, since the electric charge storable in the battery 18 is greater, even when the battery is charged with the electric charge discharged from the capacitor 22, the inter-terminal voltage of the battery 18 is hardly raised (FIG. 10) and the voltages of the battery 18 and the capacitor 22 can be surely lowered.

Furthermore, in the vehicle power supply system 10 according to the embodiment, since the charging device 19 lowers the voltage of the capacitor 22 to the predetermined voltage or less within a predetermined time after occurrence of a collision of the vehicle 1, safety at the time of a collision can be ensured more surely.

In addition, in the vehicle power supply system 10 according to the embodiment, since the rated voltage of the battery 18 is set to a value lower than the predetermined voltage, when the voltage of the capacitor 22 is lowered to the predetermined voltage or less, the electric connection between the battery 18 and the capacitor 22 is broken by the charging device 19 (time $t_{29}$ in FIG. 10 and stage (23) in FIG. 11). Accordingly, even when the battery 18 and the capacitor 22 are connected in series, since a high-voltage component having a voltage higher than the predetermined voltage is not present after the connection is broken, electric shock protection performance can be ensured sufficiently.

Next, a vehicle power supply system according to a second embodiment of the present disclosure will be described with reference to FIG. 13.

In the first embodiment described above, the inter-terminal voltage Vcap of the capacitor 22 is lowered for the purpose of electric shock protection when the vehicle 1 collides. In contrast, in the embodiment, the inter-terminal voltage Vcap of the capacitor 22 is lowered for the purpose of electric shock protection when the capacitor 22 is replaced during maintenance. Accordingly, only the difference between the embodiment and the first embodiment will be described below and the structure, operation, and effects similar to those of the first embodiment are not described. It should be noted here that the vehicle power supply system according to the present disclosure may have both the function of electric shock protection at the time of a collision in the first embodiment and the function of electric shock protection when the capacitor is replaced in the embodiment.

Figure 13:
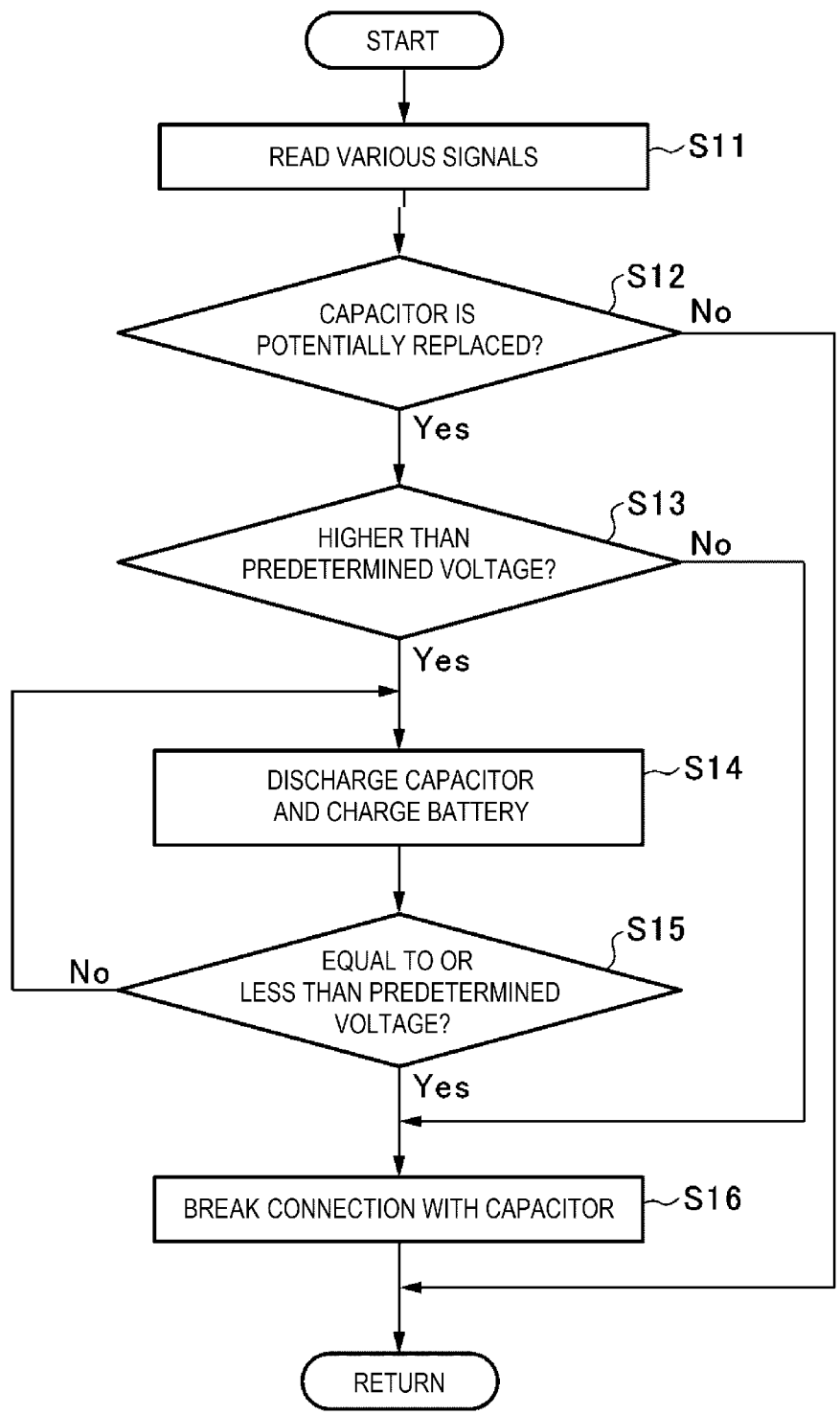
FIG. 13 is a flowchart illustrating control by a charge controller when the electric charge of the capacitor is discharged at the time of the replacement of the capacitor in a vehicle power supply system according to a second embodiment of the present disclosure.

FIG. 13 is a flowchart illustrating control by the charge controller 19a when the electric charge is discharged at the time of the replacement of the capacitor 22. The processing of the flowchart illustrated in FIG. 13 is repeatedly performed at predetermined time intervals by the charge controller 19a while the vehicle power supply system operates.

First, in step S11 in FIG. 13, various detection signals from the sensors installed in the vehicle 1 are read by the charge controller 19a. The detection signals read in step S11 include the inter-terminal voltage Vbatt of the battery 18, the inter-terminal voltage Vcap of the capacitor 22, and a signal indicating the removal of the cover (not illustrated) of the capacitor 22. It should be noted here that the inter-terminal voltages of the battery 18 and the capacitor 22 are also input to the charge controller 19a continuously in chronological order after step S11.

Next, in step S12, a determination is made as to whether the cover (not illustrated) of the capacitor 22 has been removed. That is, since the capacitor 22 mounted in the vehicle 1 is covered with the cover (not illustrated), the cover needs to be removed when the capacitor 22 is replaced. Since the portion covered with this cover is provided with a contact switch (not illustrated), a signal indicating the removal of the cover is transmitted from the contact switch to the charge controller 19a when the cover is removed. When receiving the signal indicating the removal of the cover, the charge controller 19a determines that the capacitor 22 is potentially replaced and performs the processing of step S13 and the subsequent steps to lower the inter-terminal voltage Vcap of the capacitor 22. Alternatively, when not receiving the signal indicating the removal of the cover, the charge controller 19a determines that the capacitor 22 is not replaced and the processing of the flowchart illustrated in FIG. 13 is completed one time. That is, since the capacitor 22 is not replaced in the state in which the cover (not illustrated) of the capacitor 22 is attached, the inter-terminal voltage Vcap does not need to be lowered by discharging the electric charge of the capacitor 22.

In the embodiment, the charge controller 19a determines whether the capacitor 22 is replaced based on the signal, indicating that the capacitor 22 is potentially replaced, that is transmitted from the contact switch (not illustrated). In contrast, in a modification, when an electronic unit (not illustrated) for vehicle maintenance is connected to the control device 24 of the vehicle 1, the charge controller 19a may determine that the capacitor 22 is potentially replaced. Alternatively, the charge controller 19a may determine that the capacitor 22 is potentially replaced when the place at which the vehicle 1 stops is determined to be a maintenance garage by a car navigation system (not illustrated) mounted on the vehicle 1. Accordingly, a signal indicating the connection of the electronic unit (not illustrated) for vehicle maintenance or a signal from the car navigation system (not illustrated) may also be used as the signal indicating that the capacitor 22 is potentially replaced.

In addition, in step S13, a determination is made as to whether the inter-terminal voltage Vcap of the capacitor 22 input in step S11 is higher than the predetermined voltage. The processing proceeds to step S14 when the inter-terminal voltage Vcap is higher than the predetermined voltage or the processing proceeds to step S16 when the inter-terminal voltage Vcap is equal to or less than the predetermined voltage. In step S16, the charge controller 19a breaks the electric connection between the battery 18 and the capacitor 22 (the state of stage (23) in FIG. 11). That is, since the capacitor 22 can be replaced safely when the inter-terminal voltage Vcap of the capacitor 22 is equal to or less than the predetermined voltage, the inter-terminal voltage Vcap does not need to be lowered and the electric charge of the capacitor 22 is not discharged. In addition, by breaking the electric connection between the battery 18 and the capacitor 22 in step S16, the capacitor 22 can be replaced without being affected by the electric charge stored in the battery 18. It should be noted here that the predetermined voltage at the time of a collision in the first embodiment of the present disclosure may be different from the predetermined voltage when the capacitor 22 is replaced in the embodiment.

On the other hand, in step S14, the capacitor 22 is discharged (the state of stage (21) in FIG. 11) to lower the inter-terminal voltage Vcap of the capacitor 22 and the battery 18 is charged with the discharged electric charge (the state of stage (22) in FIG. 11).

Next, in step S15, a determination is made as to whether the inter-terminal voltage Vcap of the capacitor 22 has been lowered to the predetermined voltage or less. When the inter-terminal voltage Vcap has not lowered to the predetermined voltage or less, the processing returns to step S14, and the capacitor 22 is discharged and the battery 18 is charged again. After that, the processing in step S14 is repeatedly performed until the inter-terminal voltage Vcap is lowered to the predetermined voltage or less. When the inter-terminal voltage Vcap of the capacitor 22 is lowered to the predetermined voltage or less, the processing in step S16 is performed and the processing of the flowchart illustrated in FIG. 13 is completed one time. As described above, in step S16, the electric connection between the battery 18 and the capacitor 22 is broken (the state of stage (23) in FIG. 11) and the voltages of the individual parts of the vehicle power supply system reach the predetermined voltage or less.

In the embodiment, after a determination is made as to whether the cover (not illustrated) of the capacitor 22 has been removed in step S12, the inter-terminal voltage Vcap is lowered to the predetermined voltage or less within a predetermined time. Accordingly, before the capacitor 22 is actually replaced, the inter-terminal voltage Vcap of the capacitor 22 can be surely lowered to the predetermined voltage or less.

In the vehicle power supply system according to the second embodiment, when the capacitor 22 is replaced, the charging device 19, which is a capacitor discharging device, discharges the electric charge stored in the capacitor 22 and the battery 18 is charged with the discharged electric charge. Accordingly, the electric charge stored in the capacitor 22 to be replaced can be discharged rapidly and the capacitor 22 can be replaced safely.

In addition, in the vehicle power supply system according to the embodiment, the charging device 19 also lowers the voltage of the capacitor 22 to the predetermined voltage or less within a predetermined time when the capacitor 22 is replaced. Since the voltage of the capacitor 22 is lowered rapidly when the capacitor 22 is replaced, the capacitor 22 can be replaced safely and immediately.

Although embodiments of the present disclosure have been described above, various modifications can be made to these embodiments. In particular, although the vehicle power supply system is used to drive the main driving motor and the sub-driving motors of the vehicle in the embodiments described above, the vehicle power supply system according to the present disclosure may supply electric power to any electric devices installed in the vehicle. In addition, although the vehicle power supply system can be charged by the external power supply in the embodiments described above, the present disclosure is applicable to a vehicle power supply system capable of storing only the electric power generated by a motor, an electric generator, and the like installed in the vehicle. Furthermore, although the present disclosure is applied to the vehicle power supply system having a battery with a rated voltage of 48 V in the embodiments described above, the present disclosure may be applied to the vehicle power supply system having a battery with a nominal voltage lower than a predetermined voltage.

DESCRIPTION OF REFERENCE SIGNS AND NUMERALS

1: vehicle
2a: rear wheel
2b: front wheel
10: vehicle power supply system
12: engine
14: power transmission mechanism
14a: propeller shaft
14b: transmission
16: main driving motor
16a: inverter
17: external power supply
17a: electric cable
18: battery
19: charging device (capacitor discharging device)
19a: charge controller (control device)
19b: charge capacitor
20: sub-driving motor
20a: inverter
22: capacitor
23: power feeding port (power feeding device)
24: control device
24a: longitudinal acceleration sensor
24b: lateral acceleration sensor
26: DC-to-DC converter
28: vehicle-mounted device

The invention claimed is:

1. A vehicle power supply system configured to be installed in a vehicle, comprising:
   a battery having a rated voltage lower than a predetermined voltage;
   a capacitor having a rated voltage higher than the predetermined voltage;
   circuitry configured to discharge electric charge stored in the capacitor; and
   a controller configured to control the circuitry to charge the battery by discharging the electric charge stored in the capacitor in response to detection of a collision of the vehicle or detection of a process to replace the capacitor, wherein
   the circuitry comprises
      a second capacitor;
      a first switch;
      a second switch;
      a third switch; and
      a fourth switch, wherein
      a first end of the first switch is connected to a positive terminal of the battery and a second end of the switch is connected to a first terminal of the second capacitor,
      a first end of the second switch is connected to the second end of the first switch and a second end of the second switch is connected to a connection point between a negative terminal of the capacitor and a positive terminal of the battery,
      a first end of the third switch is connected to the connection point between the negative terminal of the capacitor and the positive terminal of the battery, and a second end of the third switch is connected to a second terminal of the second capacitor, and
      a first end of the fourth switch is connected to the second terminal of the second capacitor and a second end of the fourth switch is connected to a negative terminal of the battery, and
   in a case of detecting a collision of the vehicle or detection of a process to replace the capacitor, the controller controls the first switch and the third switch to be in a closed state and the second and fourth switches to be in an open state so that power flows from the capacitor to the second capacitor.

2. The vehicle power supply system of claim 1, wherein the circuitry includes a DC-to-DC converter electrically connected to the battery and the capacitor.

3. The vehicle power supply system of claim 2, wherein the controller is configured to control the circuitry so that the DC-to-DC converter lowers a voltage of the electric charge discharged from the capacitor and charge the battery with the lowered voltage in response to a detection of a collision of the vehicle or a detection of a process to replace the capacitor.

4. The vehicle power supply system of claim 1, wherein the controller controls the circuitry so that a voltage of the capacitor is lowered to the predetermined voltage or less within a predetermined time from occurrence of a collision of the vehicle or from reception of a signal indicating that a process to replace the capacitor is being performed.

5. The vehicle power supply system of claim 4, wherein the controller controls the circuitry so that an electric connection between the battery and the capacitor is broken in a case that the voltage of the capacitor is lowered to the predetermined voltage or less.

6. The vehicle power supply system of claim 1, wherein the controller is configured to detect that a collision has occurred based on one or more signals output from one or more acceleration sensors attached to the vehicle.

7. The vehicle power supply system of claim 1, wherein the controller is configured to detect that a collision has occurred in a case of receiving an air bag deployment signal.

8. The vehicle power supply system of claim 1, wherein the controller is configured to detect that a process to replace the capacitor is being performed based on a signal received indicating that a cover for the capacitor has been removed.

9. The vehicle power supply system of claim 1, wherein the controller is configured to detect that a process to replace the capacitor is being performed when a signal is received indicating vehicle maintenance is being performed.

10. A vehicle power supply system configured to be installed in a vehicle, comprising:
a battery having a rated voltage lower than a predetermined voltage;
a capacitor having a rated voltage higher than the predetermined voltage;
circuitry configured to discharge electric charge stored in the capacitor; and
a controller configured to control the circuitry to charge the battery by discharging the electric charge stored in the capacitor in response to detection of a collision of the vehicle or detection of a process to replace the capacitor, wherein
the circuitry comprises
a second capacitor;
a first switch;
a second switch;
a third switch; and
a fourth switch, wherein
a first end of the first switch is connected to a positive terminal of the battery and a second end of the switch is connected to a first terminal of the second capacitor,
a first end of the second switch is connected to the second end of the first switch and a second end of the second switch is connected to a connection point between a negative terminal of the capacitor and a positive terminal of the battery,
a first end of the third switch is connected to the connection point between the negative terminal of the capacitor and the positive terminal of the battery, and a second end of the third switch is connected to a second terminal of the second capacitor, and
a first end of the fourth switch is connected to the second terminal of the second capacitor and a second end of the fourth switch is connected to a negative terminal of the battery, and in a case of detecting a collision of the vehicle or detection of a process to replace the capacitor and the second capacitor is charged above a threshold value, the controller is configured to control the first switch and the third switch to be in an open state and the second switch and the fourth switch to be in a closed state so that power flows from the second capacitor to the battery.

11. The vehicle power supply system of claim 10, wherein the circuitry includes a DC-to-DC converter electrically connected to the battery and the capacitor.

12. The vehicle power supply system of claim 11, wherein the controller is configured to control the circuitry so that the DC-to-DC converter lowers a voltage of the electric charge discharged from the capacitor and charge the battery with the lowered voltage in response to a detection of a collision of the vehicle or a detection of a process to replace the capacitor.

13. The vehicle power supply system of claim 10, wherein the controller controls the circuitry so that a voltage of the capacitor is lowered to the predetermined voltage or less within a predetermined time from occurrence of a collision of the vehicle or from reception of a signal indicating that a process to replace the capacitor is being performed.

14. The vehicle power supply system of claim 13, wherein the controller controls the circuitry so that an electric connection between the battery and the capacitor is broken in a case that the voltage of the capacitor is lowered to the predetermined voltage or less.

15. A vehicle power supply system configured to be installed in a vehicle, comprising:
a battery having a rated voltage lower than a predetermined voltage;
a capacitor having a rated voltage higher than the predetermined voltage;
circuitry configured to discharge electric charge stored in the capacitor; and
a controller configured to control the circuitry to charge the battery by discharging the electric charge stored in the capacitor in response to detection of a collision of the vehicle or detection of a process to replace the capacitor, wherein
the circuitry comprises
a second capacitor;
a first switch;
a second switch;
a third switch; and
a fourth switch, wherein
a first end of the first switch is connected to a positive terminal of the battery and a second end of the switch is connected to a first terminal of the second capacitor,
a first end of the second switch is connected to the second end of the first switch and a second end of the second switch is connected to a connection point between a negative terminal of the capacitor and a positive terminal of the battery,
a first end of the third switch is connected to the connection point between the negative terminal of the capacitor and the positive terminal of the battery, and a second end of the third switch is connected to a second terminal of the second capacitor, and
a first end of the fourth switch is connected to the second terminal of the second capacitor and a second end of the fourth switch is connected to a negative terminal of the battery, and in a case that the interface is receiving power from the EV charging station and a charge of second capacitor is below a threshold value, the controller is configured to control the first switch, the second switch, the third switch and the fourth switch to be in an open state and break a connection between the battery and the capacitor.

16. The vehicle power supply system of claim 15, wherein the circuitry includes a DC-to-DC converter electrically connected to the battery and the capacitor.

17. The vehicle power supply system of claim 16, wherein the controller is configured to control the circuitry so that the DC-to-DC converter lowers a voltage of the electric charge discharged from the capacitor and charge the battery with the lowered voltage in response to a detection of a collision of the vehicle or a detection of a process to replace the capacitor.

18. The vehicle power supply system of claim 15, wherein the controller controls the circuitry so that a voltage of the capacitor is lowered to the predetermined voltage or less within a predetermined time from occurrence of a collision of the vehicle or from reception of a signal indicating that a process to replace the capacitor is being performed.

19. The vehicle power supply system of claim 18, wherein the controller controls the circuitry so that an electric connection between the battery and the capacitor is broken in a case that the voltage of the capacitor is lowered to the predetermined voltage or less.

\* \* \* \* \*